(12) United States Patent
Miyaura et al.

(10) Patent No.: US 9,051,895 B2
(45) Date of Patent: Jun. 9, 2015

(54) FUEL INJECTION CONTROL APPARATUS

(75) Inventors: Takeshi Miyaura, Toyota (JP); Yoshiyasu Ito, Toyota (JP); Makio Tsuchiyama, Toyota (JP); Yoshihiro Furuya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 311 days.

(21) Appl. No.: 13/581,555

(22) PCT Filed: Feb. 23, 2011

(86) PCT No.: PCT/IB2011/000351
§ 371 (c)(1),
(2), (4) Date: Aug. 28, 2012

(87) PCT Pub. No.: WO2011/110910
PCT Pub. Date: Sep. 15, 2011

(65) Prior Publication Data
US 2012/0323468 A1    Dec. 20, 2012

(30) Foreign Application Priority Data
Mar. 12, 2010 (JP) ................................ 2010-056171

(51) Int. Cl.
*F02D 41/40* (2006.01)
(52) U.S. Cl.
CPC .............. *F02D 41/402* (2013.01); *F02D 41/40* (2013.01); *F02D 41/401* (2013.01); *F02D 41/403* (2013.01); *F02D 41/405* (2013.01); *Y02T 10/44* (2013.01)
(58) Field of Classification Search
CPC ..... F02D 41/40; F02D 41/402; F02D 41/403; F02D 41/405

USPC .......... 701/105, 104, 102; 123/299, 300, 304, 123/472, 478, 456
See application file for complete search history.

(56) References Cited

U.S. PATENT DOCUMENTS

| 2004/0025849 A1 | 2/2004 | West et al. |
| 2005/0188947 A1* | 9/2005 | Shirakawa ..................... 123/299 |

(Continued)

FOREIGN PATENT DOCUMENTS

| DE | 10 2006 043 326 A1 | 3/2008 |
| DE | 10 2007 045 606 B3 | 2/2009 |

(Continued)

OTHER PUBLICATIONS

Jul. 18, 2011 International Search Report issued in PCT/IB2011/000351.

(Continued)

*Primary Examiner* — Mahmoud Gimie
(74) *Attorney, Agent, or Firm* — Oliff PLC

(57) ABSTRACT

This apparatus is applied to an engine equipped with a fuel supply system that supplies pressure-increased fuel to a fuel injection valve, and performs the fuel injection from the injection valve in one combustion cycle by a multiple injection process that includes a pre-injection and a main injection that are executed with an interval therebetween. The apparatus calculates a deviation between a required value (one-dot chain line) and an actual value (solid line) regarding the end timing of the pre-injection, based on the manner of fluctuation of the fuel pressure in the fuel injection that is detected by a pressure sensor. A target main injection timing and a target pre-interval are individually set on the basis of the state of operation of the engine. Based on the deviation, the target main injection timing and the target pre-interval, the apparatus sets control target values regarding the execution period of the pre-injection.

10 Claims, 12 Drawing Sheets

(56) References Cited

U.S. PATENT DOCUMENTS

| | | | |
|---|---|---|---|
| 2006/0283425 A1* | 12/2006 | Tsutsui et al. | 123/478 |
| 2009/0063017 A1* | 3/2009 | Yamada et al. | 701/103 |
| 2009/0063019 A1* | 3/2009 | Yamada et al. | 701/104 |
| 2009/0112444 A1* | 4/2009 | Ishizuka et al. | 701/105 |
| 2009/0301431 A1* | 12/2009 | Kawarabayashi et al. | 123/299 |
| 2010/0076665 A1 | 3/2010 | Hehle et al. | |
| 2010/0116243 A1* | 5/2010 | Koyama et al. | 123/299 |
| 2012/0185155 A1 | 7/2012 | Nakata et al. | |

FOREIGN PATENT DOCUMENTS

| | | |
|---|---|---|
| DE | 10 2008 041 659 A1 | 3/2009 |
| DE | 10 2009 003 121 A1 | 11/2009 |
| EP | 1 767 766 A1 | 3/2007 |
| EP | 2 053 227 A1 | 4/2009 |
| JP | A-2001-227388 | 8/2001 |
| JP | A-2003-166439 | 6/2003 |
| JP | A-2005-090254 | 4/2005 |
| JP | A-2005-163559 | 6/2005 |
| JP | A-2006-029109 | 2/2006 |
| JP | A-2007-132315 | 5/2007 |
| JP | A-2009-052414 | 3/2009 |
| JP | A-2009-057924 | 3/2009 |
| JP | A-2009-057925 | 3/2009 |
| JP | A-2009-144749 | 7/2009 |
| JP | A-2009-275621 | 11/2009 |
| WO | WO 03/069146 A1 | 8/2003 |
| WO | WO 2005/021952 A1 | 3/2005 |

OTHER PUBLICATIONS

Jul. 18, 2011 Written Opinion issued in PCT/IB2011/000351.

Dec. 7, 2011 Office Action issued in Japanese Patent Application No. 2010-056171 (with partial translation).

* cited by examiner

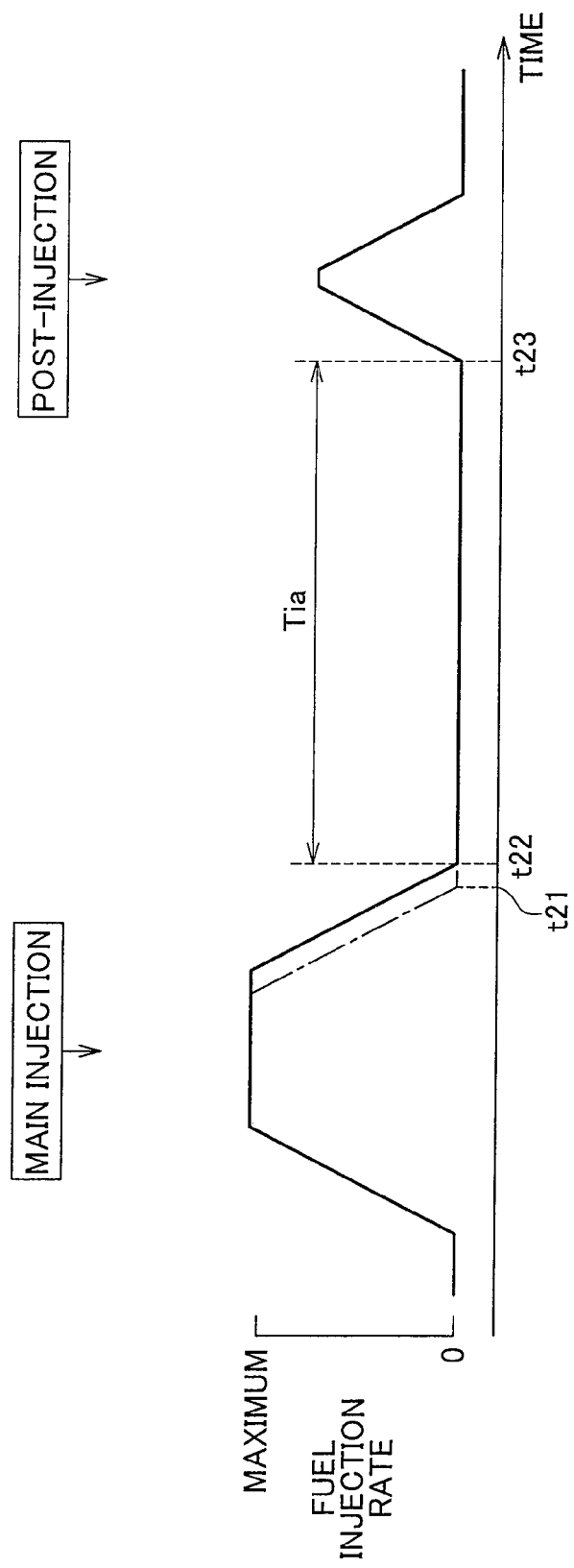

FUEL INJECTION CONTROL APPARATUS

The disclosure of Japanese Patent Application No. 2010-056171 filed on Mar. 12, 2010, including the specification, drawing and abstract is incorporated herein by reference in its entirety.

BACKGROUND OF THE INVENTION

1. Field of the Invention

The invention relates to a fuel injection control apparatus that controls the manner of fuel injection from a fuel injection provided in an engine that executes a multiple injection in which the fuel injection from the fuel injection valve in one cycle of combustion is carried out by a plurality of divided injections.

2. Description of the Related Art

Diesel engines often employ a so-called multiple injection process in which the fuel injection from a fuel injection valve in one combustion cycle is carried out by a plurality of divided injections, in order to reduce the combustion sound and achieve a clean emission. Concrete examples of the multiple injection include an injection process in which a pre-injection of a small amount of fuel is performed prior to a main injection, an injection process in which a post-injection of a small amount of fuel is performed after a main injection, etc.

In order to properly realize the effects of execution of the multiple injection, it is important to adjust the intervals between injections (injection intervals) highly accurately to a value that is appropriate for the actual operation state of the engine. The adjustment of the injection interval is usually performed by controlling the actuation of the fuel injection valve so as to reach an optimal value that is expected on the basis of the state of operation of the engine (e.g., the engine rotation speed and the intake air amount) at every given moment.

It is to be noted that if the fuel injection from the fuel injection valve is executed, this causes occurrence of pressure pulsation within a fuel supply system for supplying fuel to the fuel injection valve. In the case where the multiple injection is executed, the execution period of the fuel injection from the fuel injection valve is very short, in comparison with the case where the multiple injection is not executed. Therefore, if pressure pulsation occurs in association with execution of a preceding fuel injection in the multiple injection process, execution of the succeeding fuel injection sometimes starts before the pressure pulsation subsides. In such a case, while the fuel pressure is still fluctuating, the succeeding fuel injection is executed, incurring the risk of causing an unnecessary change of the manner of operation of the fuel injection valve. If this unnecessary change of the manner of operation results in a change in the injection interval, the effects of execution of the multiple injection may not be properly realized.

According to the related art, for example, as in International Publication No. 2003/069146, it has been proposed that in order to restrain the adverse effect of the foregoing pressure pulsation, a correction term be calculated on the basis of the state of operation of the engine (concretely, the engine rotation speed) at every given moment, and the execution period of the succeeding injection be corrected by the correction term. According to this related-art apparatus, although the manner of occurrence of pressure pulsation varies in different states of operation of the engine, the amount of change caused in operation characteristics of the fuel injection (concretely, the valve opening timing or the valve open duration thereof) by the pressure pulsation is restrained by a control based on an optimal value that is expected from the state of operation of the engine (a value suitable to a standard engine), that is, a so-called expectation-based control.

By the way, the pressure pulsation that occurs due to execution of a preceding injection in the multiple injection varies according to the state of operation of the engine, and also varies depending on the initial individual product differences and the time-dependent changes in the fuel supply system that includes the fuel injection valve. Then, the amount of change in the operation characteristics of the fuel injection valve depending on the initial individual product differences and the time-dependent changes in the fuel supply system cannot be restrained by executing the foregoing expectation-based control of the related-art apparatus, that is, a control that is appropriate for standard engines. Therefore, even if the foregoing related-art apparatus is employed, it is not possible to avoid incurring an unnecessary change in the operation characteristics of the fuel injection valve due to occurrence of the pressure pulsation caused by execution of the preceding injection in the multiple injection process, and therefore it is not possible to avoid the decline in the accuracy in adjusting the injection interval which is caused by the unnecessary change in the operation characteristics of the fuel injection valve.

SUMMARY OF THE INVENTION

The invention has been accomplished in view of the foregoing circumstances, and provides a fuel injection control apparatus capable of adjusting the injection intervals at the time of execution of the multiple injection.

According to one aspect of the invention, there is provided a fuel injection control apparatus which is applied to an engine equipped with a fuel supply system that supplies fuel in an increased pressure state to a fuel injection valve, and which performs a fuel injection from the fuel injection valve in a combustion cycle by a multiple injection that includes at least a preceding injection and a succeeding injection that are executed with an interval between the preceding injection and the succeeding injection, fuel injection control apparatus including: a fuel pressure detector configured to detect a fuel pressure that changes with a change in an actual fuel pressure in the fuel injection valve when the fuel injection valve opens; a deviation calculation portion configured to calculate a deviation between a required value and an actual value regarding an execution period of the preceding injection based on a manner of fluctuation of the fuel pressure detected by the fuel pressure detector; and a preceding injection setting portion configured to set a control target value regarding a start timing of the succeeding injection and a control target value regarding an injection interval between the preceding injection and the succeeding injection individually based on state of operation of the engine, and also configured to set a control target value regarding the execution period of the preceding injection based on the control target values that are individually set and the deviation that is calculated by the deviation calculation portion.

When the fuel injection from the fuel injection valve is executed, the fuel pressure within the fuel injection valve temporarily declines. Therefore, by monitoring the manner of fluctuation of the fuel pressure, it is possible to accurately grasp the period during which the fuel injection is actually executed. Furthermore, a deviation between the actual value and the required value of the execution period of the fuel injection can be calculated by comparing the actual execution period (actual value) of the fuel injection grasped as described and the execution period (required value) of the fuel injection that is expected from the control target value regarding the execution period.

According to the foregoing fuel injection control apparatus, although the manner of occurrence of the pressure pulsation that occurs in the fuel supply system in association with the fuel injection from the fuel injection valve varies depending on the initial individual product differences or the time-dependent changes in the fuel supply system, the amount of deviation of the actual execution period of the preceding injection caused by a change in the operation characteristics of the fuel injection valve (concretely, the valve-opening timing and the valve open duration) which is caused by the pressure pulsation can be grasped on the basis of the manner of fluctuation of the fuel pressure that is detected by the fuel pressure detector. Then, after the amount of deviation of the actual execution period of the preceding injection that is grasped as described above is taken into consideration, a control target value of the start timing of the succeeding injection and a control target value of the ignition interval can be set. Furthermore, on the basis of those control target values, control target values of the execution period of the preceding injection can be set. Therefore, a value able to precisely restrain an unnecessary change of the actual execution period of the preceding injection can be set as a control target value of the execution period of the preceding injection, and the injection interval during execution of the multiple injection can be accurately adjusted independently of the initial individual product differences or the time-dependent changes in the fuel supply system.

Besides, in the fuel injection control apparatus, the deviation calculation portion may calculate as the deviation a deviation between the required value and the actual value regarding an end timing of the preceding injection.

In the case where the multiple injection is executed, the accuracy in setting the interval between the end timing of the preceding injection and the start timing of the succeeding injection is particularly important among the injection intervals in the multiple injection. According to the foregoing construction, the deviation between the required value and the actual value regarding the end timing of the preceding injection can be calculated, and while the deviation is taken into account, a control target value of the execution period of the preceding injection can be set. Therefore, the injection interval can be appropriately set so that the interval between the end timing of the preceding injection and the starting timing of the succeeding injection becomes a value that is appropriate for actual conditions.

Besides, in the fuel injection control apparatus, the preceding injection setting portion may individually set a control target value regarding a start timing of the preceding injection and a control target value regarding an execution duration of the preceding injection, as the control target value regarding the execution period of the preceding injection.

In the case of execution of the multiple injection, the setting of the start timing and the execution duration of the preceding injection automatically determines the end timing of the preceding injection. According to the foregoing fuel injection control apparatus, it is possible to properly perform the setting of various control target values regarding the start timing and the execution duration of the preceding injection while taking the foregoing deviation into account. Due to this, it becomes possible to set a timing that is able to restrain the deviation to a small amount as the end timing of the preceding injection, so that it becomes possible to appropriately set the interval between the end timing of the preceding injection and the start timing of the succeeding injection.

Besides, in the fuel injection control apparatus, the fuel supply system may have a pressure-accumulating container that accumulates fuel in the increased pressure state and that is connected to the fuel injection valve, and the fuel injection control apparatus may further include an adjustment portion configured to adjust the fuel pressure in the pressure-accumulating container based on the state of operation of the engine, and the preceding injection setting portion may individually set the control target value regarding the start timing of the preceding injection and the control target value regarding the execution duration of the preceding injection based on the fuel pressure in the pressure-accumulating container.

If the start timing of the preceding injection is changed, the pressure in the combustion chamber at the time of execution of the preceding injection accordingly changes, and therefore the amount of fuel injected from the fuel injection valve also changes. Therefore, in the case where the start timing of the preceding injection is changed, it is possible to restrain unnecessary changes in the fuel injection amount by changing the execution duration of the preceding injection in accordance with the change in the start timing. Besides, in the apparatus in which the fuel pressure in the pressure-accumulating container is adjusted according to the state of operation of the engine, the degree of change in the fuel injection amount that occurs when the start timing of the preceding injection is changed by a fixed amount varies according to the fuel pressure in the pressure-accumulating container.

According to the foregoing fuel injection control apparatus, since the start timing and the execution duration of the preceding injection are set on the basis of the fuel pressure in the pressure-accumulating container, it becomes possible to properly set the injection interval through the setting of the start timing and the execution duration of the preceding injection, and it also becomes possible to properly set the fuel injection amount as well.

Besides, the preceding injection setting portion may calculate a control basic value regarding the execution period of the preceding injection based on the control target value regarding the start timing of the succeeding injection and the control target value regarding the injection interval, calculate a correction term based on the deviation, and set a value in which the correction term is reflected on the control basic value, as the control target value regarding the execution period of the preceding injection.

Besides, in the fuel injection control apparatus, the preceding injection setting portion may gently change the calculated correction term to a value that is appropriate for the deviation.

According to the foregoing fuel injection control apparatus, sharp changes of the correction term can be restrained. Therefore, even in the case where a value that may lower the accuracy in setting the correction term is calculated as the deviation, the decline in the setting accuracy due to this calculation can be restrained.

Besides, in the fuel injection control apparatus, the fuel injection control apparatus may execute as the multiple injection a fuel injection that includes a further succeeding injection that is executed at an interval following completion of execution of the succeeding injection, and the fuel injection control apparatus may further include: a correction portion configured to correct a control target value regarding the execution period of the succeeding injection based on the fuel pressure detected by the fuel pressure detector; a required value calculation portion configured to calculate the required value regarding the injection interval between the succeeding injection and the further succeeding injection based on the state of operation of engine; and a succeeding injection setting portion configured to set a control target value regarding the execution period of the further succeeding injection based on a value in which an amount of correction made by the correction portion is reflected on the required value.

Even if the manner of the pressure pulsation that occurs in the fuel supply system in association with execution of the main injection is fixed, variation of the injection interval causes variation of the fuel pressure in the fuel supply system at the time of execution of a subsequent injection, and therefore results in variation of the manner of fluctuation of the fuel pressure in the fuel supply system. Therefore, in order to properly adjust the fuel injection amount of the post-injection after taking the effect of the pressure pulsation into consideration, it is critical to accurately grasp the actual injection interval.

According to the foregoing fuel injection control apparatus, in the case where a control target value regarding the execution period of the succeeding injection is corrected, a value in which the amount of correction made in that correction of the control target value is reflected on the required value of the injection interval, that is, a value that is close to the actual injection interval, can be used as a basis for setting a control target value regarding the execution period of the further succeeding injection. Therefore, although the pressure pulsation occurs in the fuel supply system in association with execution of the succeeding injection, the execution period of the further succeeding injection can be properly set in a manner commensurate with the effect of the pressure pulsation at the time of execution of the further succeeding injection.

Besides, in the fuel injection control apparatus, the fuel pressure detector may be a pressure sensor that is attached to the fuel injection valve.

According to the foregoing fuel injection control apparatus, it is possible to detect the fuel pressure at a site near the injection hole of the fuel injection valve and therefore accurately detect declines in the fuel pressure in the fuel injection valve that occur in association with the opening of the fuel injection valve, in comparison with an apparatus in which the fuel pressure is detected at a position remote from the fuel injection valve. Hence, it becomes possible to accurately detect the period during which the fuel injection is actually executed, on the basis of the manner of fluctuation of the fuel pressure, so that it becomes possible to accurately calculate the foregoing deviation.

Besides, in the fuel injection control apparatus, the engine may have a plurality of cylinders, and the fuel supply system may have a pressure-accumulating container that is configured to accumulate fuel in the increased pressure state, and the fuel injection valve may be provided individually for each cylinder, and the fuel injection valves may be individually connected to the pressure-accumulating container, and the fuel pressure detector may be provided individually for each cylinder of the engine, and each fuel pressure detector may be configured to detect the fuel pressure at a site in a fuel supply passageway that supplies fuel to a corresponding one of the fuel injection valves, the site being between the pressure-accumulating container and an injection hole of the corresponding one of the fuel injection valves.

According to the foregoing fuel injection control apparatus, in a multi-cylinder engine in which the operation characteristics of the fuel injection valves vary from one cylinder to another, the injection interval in the fuel injection from each fuel injection valve can be accurately set on the basis of the fuel pressure detected by a corresponding one of the fuel pressure detectors that are provided individually for each cylinder. Therefore, it becomes possible to highly accurately set the injection interval in the fuel injection performed for each cylinder, so that variations of the injection interval among the cylinders can be restrained.

Furthermore, in the fuel injection control apparatus, the fuel injection valve may have a pressure chamber that operates so that the fuel pressure in the pressure chamber urges a needle valve to a valve-closing side, and a nozzle chamber that is supplied with fuel in the increased pressure state and that operates so that the fuel pressure in the nozzle chamber urges the needle valve to a valve-opening side, and the fuel injection valve may perform the fuel injection from an injection hole by lowering the fuel pressure in the pressure chamber so as to move the needle valve.

In the foregoing fuel injection control apparatus, if the fuel pressure in the pressure chamber is lowered so as to open the fuel injection valve, the fuel pressure in the nozzle chamber accordingly becomes relatively high, so that the needle valve moves to the valve-opening side. This fuel injection valve is structured so as to be opened by utilizing the pressure of fuel supplied in the nozzle chamber from the pressure-accumulating container. Therefore, in the case where pressure pulsation occurs in the fuel supply system, the fuel injection valve is liable to be affected by the pressure pulsation, in comparison with a type of fuel injection valve whose needle valve is directly driven by an actuator.

According to the foregoing fuel injection control apparatus, it is possible to accurately adjust the injection interval at the time of execution of the multiple injection in an apparatus that employs the fuel injection valve that is liable to be affected by the pressure pulsation.

BRIEF DESCRIPTION OF THE DRAWINGS

The features, advantages, and technical and industrial significance of this invention will be described below with reference to the accompanying drawings, in which like numerals denote like elements, and wherein:

FIG. 13 is a time chart showing an example of a relation between the main injection and a post-injection in the fuel injection process of an engine in the second embodiment.

DETAILED DESCRIPTION OF EMBODIMENTS

A fuel injection control apparatus in accordance with a first embodiment in which the invention is embodied will be described below.

Figure 1:
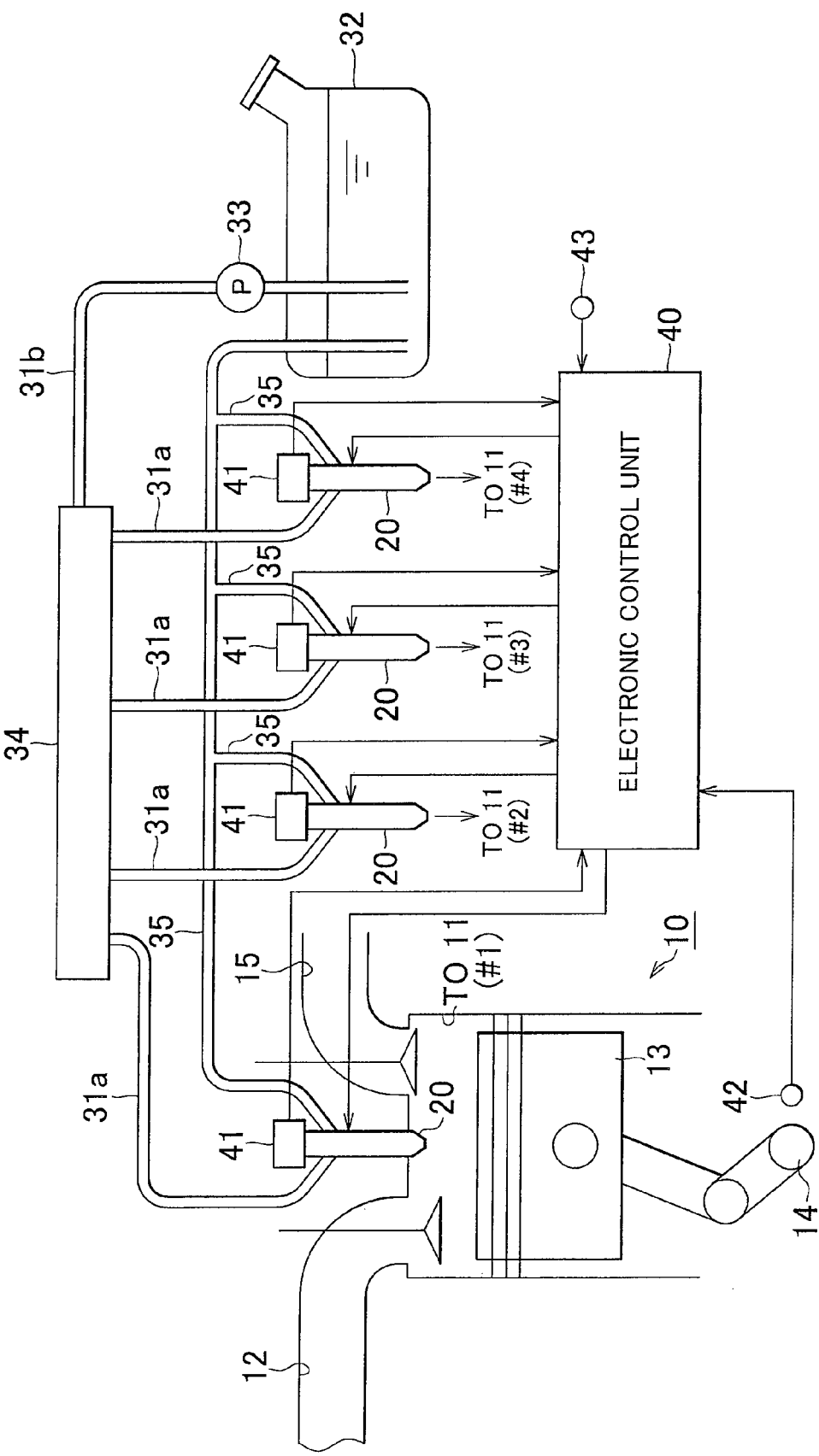
FIG. 1 shows a general construction of an engine to which a fuel injection control apparatus in accordance with a first embodiment of the invention is applied.

FIG. 1 shows a general construction of an engine to which a fuel injection control apparatus in accordance with this embodiment is applied. As shown in FIG. 1, an intake passageway 12 is connected to cylinders 11 of an engine 10. Air is taken into the cylinders 11 of the engine 10 through the intake passageway 12. Incidentally, this engine 10 is a diesel engine that has a plurality of cylinders 11 (four cylinders #1 to #4 in this embodiment). In the engine 10, direct injection-type fuel injection valves 20 that inject fuel directly into the cylinders 11 are mounted individually for each cylinder 11. The fuel injected into each cylinder 11 of the engine 10 by valve-opening actuation of the fuel injection valve 20 is ignited and burned upon contact with the intake air that has been compressed and heated in the cylinder 11. Due to the energy generated by the combustion of fuel in the cylinders 11 of the engine 10, pistons 13 are pushed to force a crankshaft 14 to rotate. The combustion gas produced by the combustion in the cylinders 11 of the engine 10 is discharged therefrom as exhaust gas into an exhaust passageway 15 of the engine 10.

The fuel injection valves 20 are individually connected to a common rail 34 via branch passageways 31a. A fuel tank 32 is connected to the common rail 34 via a supply passageway 31b. The supply passageway 31b is provided with a fuel pump 33 that pumps fuel. In this embodiment, the fuel whose pressure has been raised by the pumping of the fuel pump 33 is stored in the common rail 34, and is supplied into each fuel injection valve 20. In this embodiment, the fuel injection valves 20, the branch passageways 31a, the supply passageway 31b, the fuel pump 33 and the common rail 34 constitute a fuel supply system.

A return passageway 35 is connected to each fuel injection valve 20. The return passageways 35 are connected to the fuel tank 32. A portion of the fuel within the fuel injection valves 20 is returned to the fuel tank 32 via their respective return passageways 35.

Figure 2:
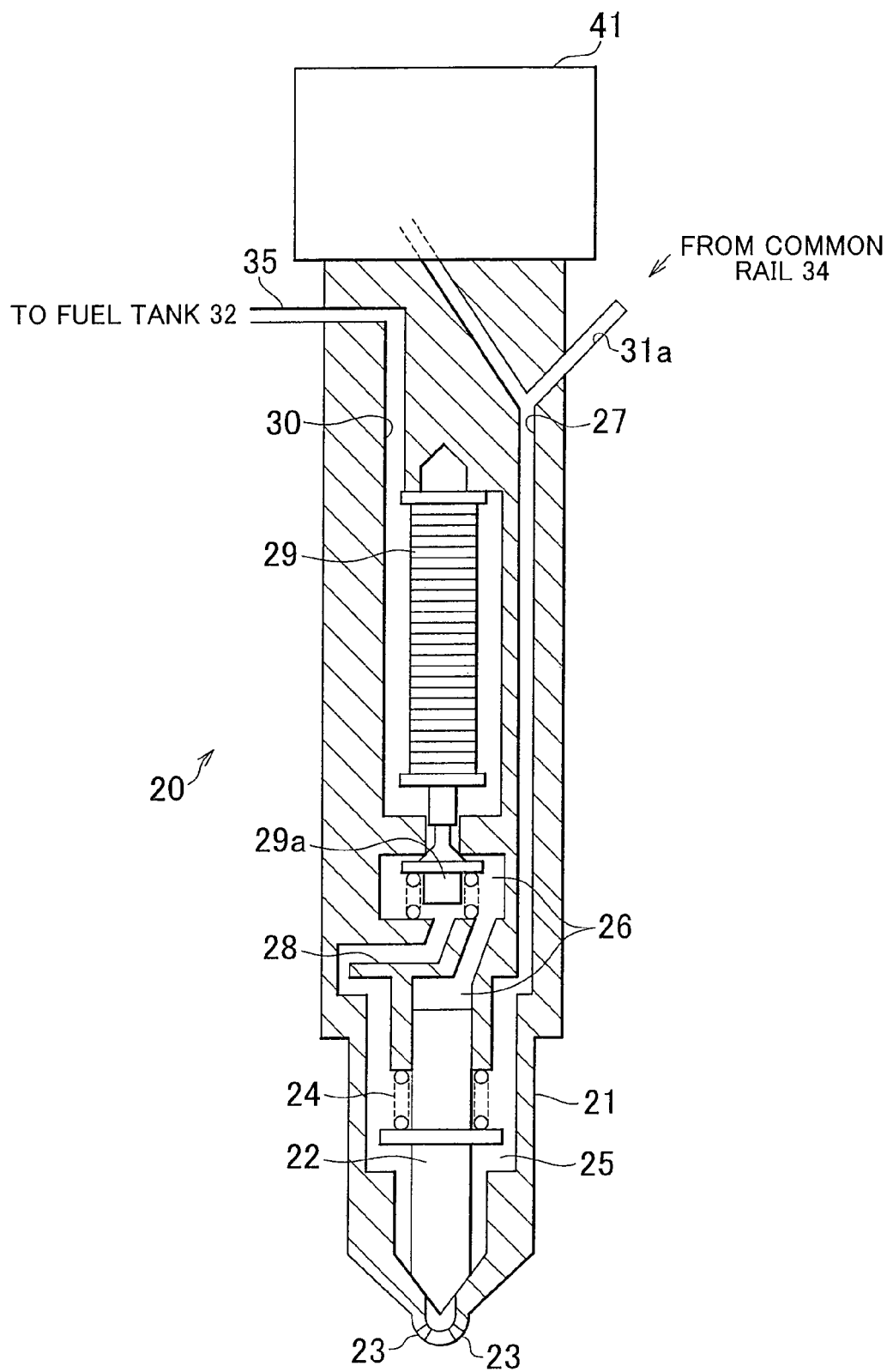
FIG. 2 is a sectional view showing a sectional structure of a fuel injection valve shown in FIG. 1.

Hereinafter, an internal structure of the fuel injection valves 20 will be described. FIG. 2 shows a sectional structure of a fuel injection valve 20. As shown in FIG. 2, a needle valve 22 is provided within a housing 21 of the fuel injection valve 20. This needle valve 22 is provided so as to be movable back and forth (movable in up-down directions in FIG. 2) within the housing 21. A spring 24 that always urges the needle valve 22 to the side of an injection hole 23 (a lower side in FIG. 2) is provided within the housing 21. Besides, within the housing 21, a nozzle chamber 25 is formed on one of two sides of the needle valve 22 (a lower side thereof in FIG. 2), and a pressure chamber 26 is formed on the other side (an upper side in FIG. 2).

The nozzle chamber 25 is provided with the injection hole 23 that provides communication between the inside and the outside of the housing 21. The nozzle chamber 25 is supplied with fuel from the branch passageway 31a (from the common rail 34) through an introduction passageway 27. On the other hand, the pressure chamber 26 communicates with the nozzle chamber 25 through a communication passageway 28 that is formed within the housing 21. Besides, the pressure chamber 26 is connected to the return passageway 35 (to the fuel tank 32) via a discharge passage 30 that is formed within the housing 21.

The fuel injection valves 20 employed in this embodiment are of an electrically driven type. Specifically, a piezoelectric actuator 29 in which piezoelectric elements that expand and contract in response to input of a drive signal are stacked is provided within the housing 21. A valve body 29a is attached to the piezoelectric actuator 29. The valve body 29a is disposed within the pressure chamber 26. Therefore, as the valve body 29a is moved by actuation of the piezoelectric actuator 29, one of the communication passageway 28 (the nozzle chamber 25) and the discharge passage 30 (the return passageway 35) is selectively connected in communication with the pressure chamber 26.

In this fuel injection valve 20, when a valve-closing signal is input to the piezoelectric actuator 29, the piezoelectric actuator 29 contracts moving the valve body 29a together, so that the communication passageway 28 and the pressure chamber 26 communicate with each other and the communication between the return passageway 35 and the pressure chamber 26 is shut off. Therefore, while the discharge of fuel from the pressure chamber 26 to the return passageway 35 (to the fuel tank 32) is prohibited, the nozzle chamber 25 and the pressure chamber 26 are connected in communication with each other. In consequence, since the pressure difference between the nozzle chamber 25 and the pressure chamber 26 becomes very small, the needle valve 22 is moved by the force of the spring 24 to a position at which the needle valve 22 closes the injection hole 23. Therefore, at this time, a state in which the fuel injection from the fuel injection valve 20 is not executed (a closed valve state) is assumed.

On the other hand, when a valve-opening signal is input to the piezoelectric actuator 29, the piezoelectric actuator 29 elongates moving the valve body 29a together, so that the communication between the communication passageway 28 and the pressure chamber 26 is shut off, and the return passageway 35 and the pressure chamber 26 communicate with each other. Due to this, while the outflow of fuel from the nozzle chamber 25 to the pressure chamber 26 is prohibited, a portion of the fuel in the pressure chamber 26 is returned to the fuel tank 32 through the return passageway 35. In consequence, the pressure in the pressure chamber 26 declines, so that the pressure difference between the pressure chamber 26 and the nozzle chamber 25 becomes larger. Due to the increased pressure difference, the needle valve 22 is moved, overcoming the force of the spring 24, to leave the injection hole 23. Therefore, at this time, a state in which the fuel injection from the fuel injection valve 20 is executed (an open valve state) is assumed.

Thus, the fuel injection valve 20 operates so that the fuel pressure in the pressure chamber 26 urges the needle valve 22 to the valve-closing side, and also operates so that the fuel pressure in the nozzle chamber 25 urges the needle valve 22 to the valve-opening side. Then, the fuel pressure in the pressure chamber 26 is lowered to move the needle valve 22 so that the fuel injection from the injection hole 23 is performed.

The fuel injection valve 20 is provided integrally with a pressure sensor 41 that outputs a signal commensurate with the fuel pressure PQ in the introduction passageway 27. Therefore, this fuel injection control apparatus is able to detect the fuel pressure at a site near the injection hole 23 of the fuel injection valve 20 and therefore accurately detect changes in the fuel pressure in the fuel injection valve 20 that occur in association with the opening of the fuel injection valve 20, in comparison with an apparatus in which the fuel pressure at a position remote from the fuel injection valve 20, for example, the fuel pressure in the common rail 34 (see FIG. 1) or the like, is detected. Incidentally, pressure sensors 41 as described above are provided, one for each fuel injection valve 20, that is, one for each cylinder 1 of the engine 10.

As shown in FIG. 1, the engine 10 is provided with various sensors as peripheral appliances for detecting states of operation of the engine 10. Examples of the sensors, besides the foregoing pressure sensors 41, include a crankshaft sensor 42 for detecting the rotation phase of the crankshaft 14 (the crankshaft angle CA) and the rotation speed thereof (the engine rotation speed NE), an accelerator sensor 43 for detecting the amount of operation of an accelerator operating member (e.g., an accelerator pedal) (the accelerator operation amount ACC), etc.

Besides, peripheral appliances provided for the engine 10 are, for example, an electronic control unit 40 that includes a microcomputer, and the like. The electronic control unit 40 receives signals from various sensors, and executes various computations on the basis of the signals. Then, according to results of the computations, the electronic control unit 40 executes various controls regarding the operation of the engine 10, such as an actuation control of the fuel injection valves 20 (fuel injection control), and the like.

The fuel injection control in this embodiment is executed basically as described below. First, on the basis of the state of operation of the engine 10 (concretely, the accelerator operation amount ACC and the engine rotation speed NE), a control target value regarding the fuel injection amount (target fuel injection amount TQ) is calculated and an injection pattern is selected. After that, various control target values regarding the individual fuel injection in the selected injection pattern are calculated on the basis of the target fuel injection amount TQ and the engine rotation speed NE. Then, the fuel injection valves 20 are individually driven to open in manners commensurate with the control target values. Due to this, an amount of fuel appropriate for the state of engine operation is injected from each fuel injection valve 20 into a corresponding one of the cylinders 11 of the engine 10, in an injection pattern suitable to the state of operation of the engine 10 at every given moment.

Incidentally, in this embodiment, a plurality of injection patterns that each combines a main injection with a pre-injection or a post-injection are set beforehand, and these injection patterns are stored in the electronic control unit 40. When the fuel injection control is to be executed; one of the injection patterns is selected. As various control target values mentioned above, control target values regarding the amount of fuel injected by various injections, such as the main injection, the pre-injection, the post-injection, etc., and control values regarding the execution timings of the various injections, such as the start timing of the main injection, the interval between the pre-injection and the main injection (injection interval), etc., are calculated.

In this embodiment, in conjunction with execution of the foregoing fuel injection control, an actuation control of the fuel pump 33 (a rail pressure control) is executing. The rail pressure control is executed so as to adjust the fuel pressure in the common rail 34 (the rail pressure) in a manner commensurate with the state of operation of the engine 10. Concretely, a control target value regarding the foregoing rail pressure (a target rail pressure Tpr) is calculated from the target fuel injection amount TQ and the engine rotation speed NE. Then, the actuation of the fuel pump 33 is controlled so that the actual rail pressure becomes equal to the target rail pressure Tpr, whereby the amount of fuel pumped by the fuel pumped 33 is adjusted. In this embodiment, this rail pressure control functions as an adjustment portion.

In the engine 10 in this embodiment, a multiple injection process in which the fuel injection from each fuel injection valve 20 in one combustion cycle is carried out by a plurality of divided injections (concretely, a combination of the main injection with the pre-injection or the post-injection) is executed. In the execution of the multiple injection, in order to properly realize the effect thereof, it is important to properly adjust intervals between injections (injection intervals) in a manner commensurate with the actual state of operation of the engine 10. Basically in this embodiment, the adjustment of the injection interval is performed by executing the fuel injection control on the basis of the state of operation of the engine 10 at every given moment.

It is to be noted herein that execution of the fuel injection from the fuel injection valves 20 results in occurrence of pressure pulsation in a fuel supply system provided for supplying fuel to the fuel injection valves 20. Since the engine 10 executes the multiple injection, the execution intervals between fuel injections from each fuel injection valve 20 is very short, in comparison with engines that does not execute the multiple injection. Therefore, when pressure pulsation occurs in association with execution of a preceding fuel injection (e.g., the pre-injection), the succeeding fuel injection (e.g., the main injection) sometimes starts to be executed before the pressure pulsation subsides. In this case, since the succeeding injection is executed while the fuel pressure is fluctuating, there is a risk of bringing about an unnecessary change in the manner of operation of the fuel injection valve 20. Then, if such an unnecessary change in the manner of operation changes the injection interval, there arises a risk that the effect of execution of the multiple injection may not be properly realized.

Incidentally, the fuel injection valves 20 in this embodiment are each designed so that the needle valve 22 moves to the valve-opening side to open when the fuel pressure in the pressure chamber 26 (FIG. 2) is lowered to relatively heighten the fuel pressure in the nozzle chamber 25. Thus, the fuel injection valves 20 employed in this embodiment each have a structure in which the valve is opened by utilizing the pressure of fuel supplied in the nozzle chamber 25 from the common rail 34. Therefore, it can be said that when pressure pulsation occurs in the fuel supply system, the fuel injection control apparatus is liable to be affected by the pressure pulsation, in comparison with an apparatus that employs fuel injection valves whose needles valves are directly driven by actuators.

The pressure pulsation that occurs when a preceding injection in the multiple injection varies according to the state of operation of the engine 10, and also varies depending on the initial individual product variations or the time-dependent changes in the fuel supply system that includes the fuel injection valves 20. The amount of change in the operation characteristics of the fuel injection valves 20 caused by the initial individual product differences or time-dependent changes in the fuel supply system cannot be properly restrained merely by executing only the fuel injection control based on the state of operation of the engine 10, that is, only a control appropriate to a standard engine.

In consideration of these circumstances, in this embodiment, in order to compensate for the error of the injection interval between the pre-injection and the main injection that results from the initial individual product differences or time-dependent changes in the fuel supply system, control target values regarding the execution periods of the pre-injection and of the main injection are set as follows.

Figure 3:
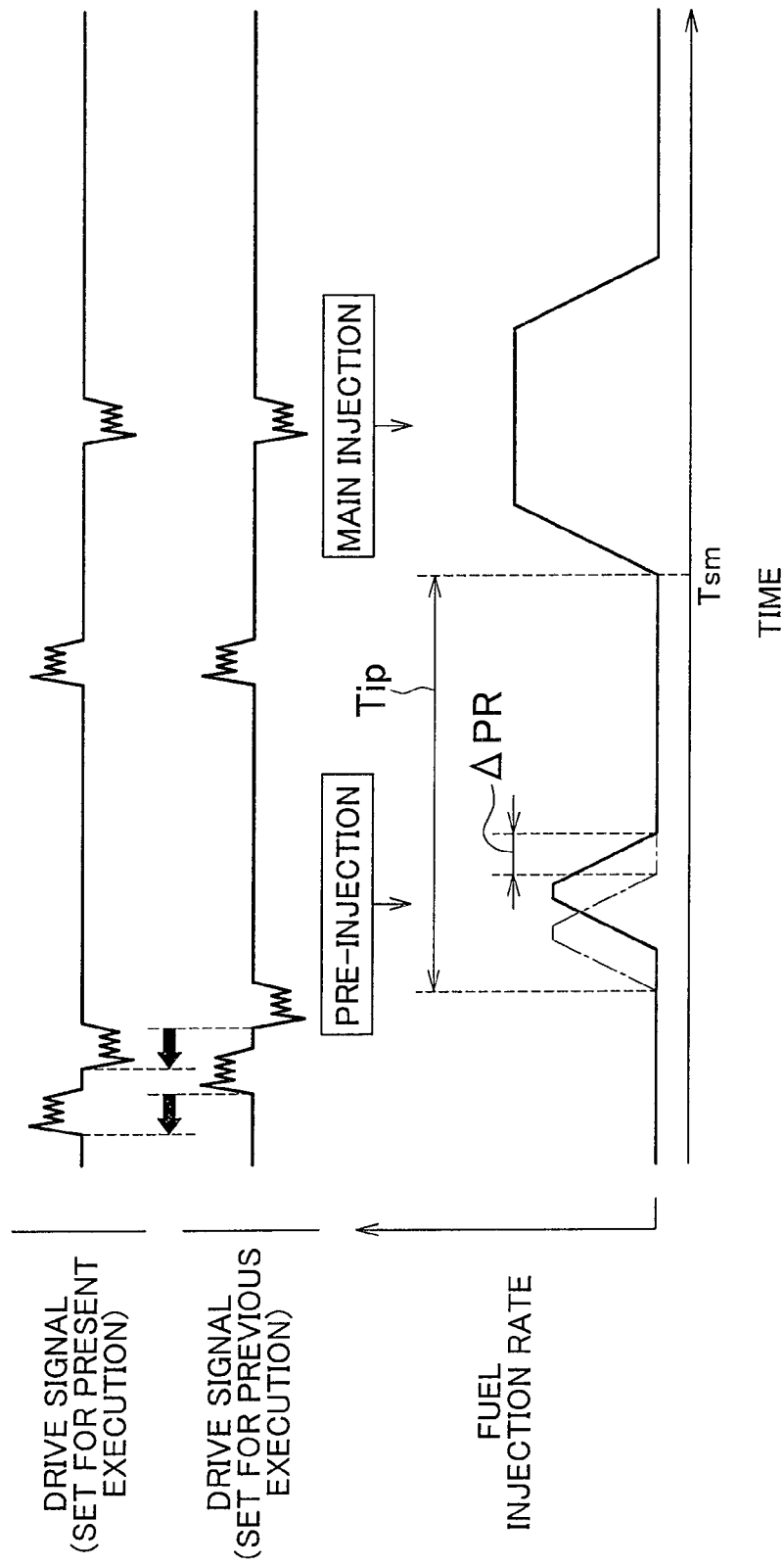
FIG. 3 is a time chart showing an example of a relation between a pre-injection and a main injection in a fuel injection process of the engine.

FIG. 3 shows an example of a relation between the pre-injection and the main injection. As shown in FIG. 3, firstly, a control target value regarding the start timing of the main injection (a target main injection timing Tsm) and a control target value regarding the injection interval between the pre-injection and the main injection (a target pre-interval Tip) are calculated on the basis of the target fuel injection amount TQ and the engine rotation speed NE.

Besides, the actual value of the execution period of the pre-injection (specifically, the timing at which the closing operation of the fuel injection valve 20 is completed (valve-closing operation completion timing)) (shown by a solid line in FIG. 3) is detected on the basis of the manner of fluctuation of the fuel pressure PQ detected by the pressure sensor 41 in the previous execution of the pre-injection. Besides, a deviation ΔPR between the actual value and a required value of the valve-closing operation completion timing is calculated. Incidentally, the required value used herein is the valve-closing operation completion timing that is determined by control target values regarding the execution period of the pre-injection (a target pre-injection timing Tsp and a target pre-injection duration Ttp described below) used in the previous execution of the pre-injection.

After that, a control target value regarding the start timing of the pre-injection (a target pre-injection timing Tsp) and a control target value regarding the execution duration of the pre-injection (a target pre-injection duration Ttp) are set on the basis of the target main injection timing Tsm, the target pre-interval Tip and the deviation ΔPR.

By setting the various control target values regarding the execution periods of the main injection and of the pre-injection in the foregoing manner, the following operation and effects are achieved. Since execution of the pre-injection temporarily lowers the fuel pressure in the fuel injection valve 20, the monitoring of the manner of fluctuation of the fuel pressure (specifically, the fuel pressure PQ) makes it possible to accurately grasp the period during which the pre-injection is actually executed at the time of the previous execution of the pre-injection. Furthermore, by comparing the actual valve-closing operation completion timing (an actual value) of the pre-injection grasped as described above with a valve-closing operation completion timing (a required value) that is expected on the basis of the various control target values, it is possible to calculate a deviation between the actual value and the required value of the valve-closing operation completion timing.

Therefore, in the apparatus of this embodiment, although the manner of fluctuation of the pressure pulsation that occurs in the fuel supply system in association with execution of the pre-injection varies depending on the initial individual product differences or time-dependent changes in the fuel supply system, it is possible to grasp the amount of departure (the deviation ΔPR) of the actual execution period of the pre-injection that is caused by changes in the operation characteristics of the fuel injection valve 20 that result from the variation of the manner of fluctuation of the pressure pulsation (concretely, changes in the valve opening timing and the valve-open duration) on the basis of the manner of fluctuation of the fuel pressure PQ detected by the pressure sensor 41.

Then, after the amount of departure of the actual execution period of the pre-injection grasped as described above is taken into account, a target pre-injection timing Tsp and a target pre-injection duration Ttp can be set on the basis of the target main injection timing Tsm and the target pre-interval Tip that are set on the basis of the state of operation of the engine 10. Due to this, the target pre-injection timing Tsp and the target pre-injection duration Ttp can be set at values that are able to precisely restrain unnecessary changes of the actual execution period of the pre-injection, so that the injection intervals during execution of the multiple injection can be accurately adjusted independently of the initial individual product differences and the time-dependent changes in the fuel supply system.

Incidentally, in the example shown in FIG. 3, since the actual end timing of the pre-injection is later than the required value, the, target pre-injection timing Tsp and the target pre-injection duration Ttp are set so that the end timing is set at an early timing. Due to this, the timing of outputting the drive signal to the fuel injection valve 20 in the present execution is a timing that is earlier than the corresponding timing in the previous execution of the pre-injection by an amount shown by solid arrows in FIG. 3.

If the start timing of the pre-injection is changed, a corresponding change occurs in the pressure in the cylinder 11 (specifically, the combustion chamber) of the engine 10 during execution of the pre-injection, so that the amount of fuel injected from the fuel injection valve 20 also changes. Therefore, when the start timing of the pre-injection is to be changed, an unnecessary change in the fuel injection amount can be restrained by changing the execution duration of the pre-injection in association with the change of the start timing. Besides, in the apparatus of this embodiment, since the rail pressure control is executed, the degree of the change in the fuel injection amount that is caused when the start timing of the pre-injection is changed varies according to the rail pressure.

In consideration of the foregoing respect, this embodiments adopts the foregoing rail pressure (specifically, the target fuel injection amount TQ and the engine rotation speed NE that are parameters for calculating the target rail pressure Tpr) as a parameter for use for setting the target pre-injection timing Tsp and the target pre-injection duration Ttp. Due to this, it becomes possible to properly set the injection interval between the pre-injection and the main injection through setting the target pre-injection timing Tsp and the target pre-injection duration Ttp, and it also becomes possible to properly set the fuel injection amount of the pre-injection.

In the case where an injection pattern in which the multiple injection is executed is selected, if an injection interval between injections in the multiple injection is set by an expectation-based control, the injection interval unnecessarily changes due to the effect of the initial individual product differences or time-dependent changes in the fuel supply system. Therefore, if in an apparatus of a comparative example, the injection interval is set at a relatively short period, an unnecessary reduction of the injection interval may cause the injection interval to be "0", making it impossible to execute the multiple injection. Therefore, the comparative-example apparatus cannot but set a relatively long period provided with a margin as a injection interval. This constraint regarding the setting of the injection interval serves as a factor that lowers the degree of freedom in the setting of the execution periods of the various injections.

According to this embodiment, since the injection intervals between the injections in the multiple injection can be set with high accuracy, it becomes possible to set a short period as an injection interval independently of the foregoing constraint. Therefore, the degree of freedom in setting the execution periods of the injections in the multiple injection can be considerably improved, so that it becomes possible to execute the fuel injection in various injection patterns that cannot be realized in the foregoing apparatus of the comparative example.

Figure 4:
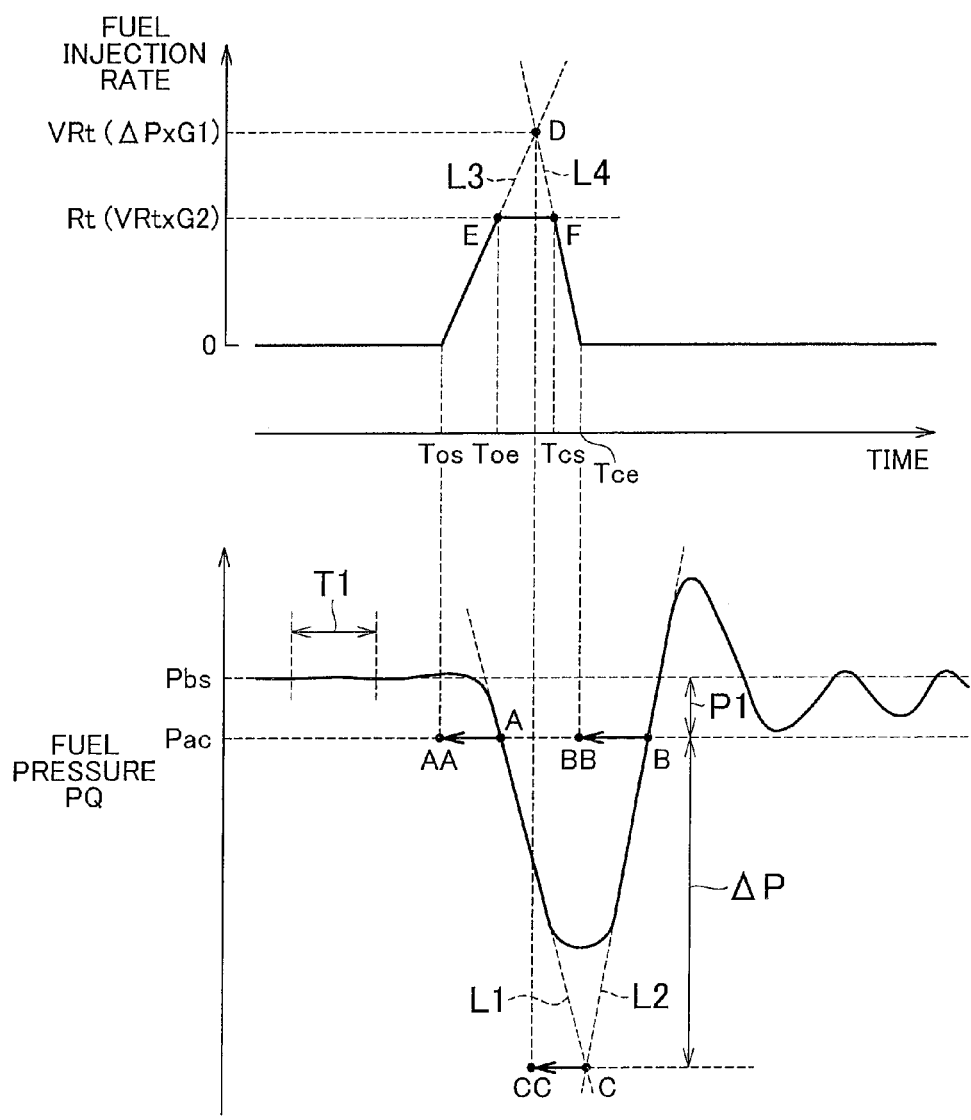
FIG. 4 is a time chart showing a relation between a time waveform of the fuel pressure and a detection time waveform of the fuel injection rate in the fuel injection process of the engine.

Hereinafter, a procedure of detecting the actual execution period of the pre-injection on the basis of the fuel pressure PQ will be described in detail. FIG. 4 shows a relation between the time waveform of the fuel pressure PQ and the detection time waveform of the fuel injection rate.

As shown in FIG. 4, in this embodiment, the timing at which the valve-opening operation of the fuel injection valve 20 (specifically, the movement of the needle valve 22 to the valve-opening side) is started (valve-opening operation start timing Tos), the timing at which the fuel injection rate becomes maximum (maximum injection rate attainment timing Toe), the timing at which decrease of the fuel injection rate is started (injection rate decrease start timing Tcs), and the timing at which the valve-closing operation of the fuel injection valve 20 (specifically, the movement of the needle valve 22 to the valve-closing side) is completed (valve-closing operation completion timing Tce) are detected.

Firstly, an average value of the fuel pressure PQ during a predetermined period T1 immediately before the valve-opening operation of the fuel injection valve 20 is started is calculated, and the average value is stored as a reference pressure Pbs. This reference pressure Pbs is used as a pressure that corresponds to the fuel pressure in the fuel injection valve 20 at the time of closure of the valve.

Next, a value obtained by subtracting a predetermined pressure P1 from the reference pressure Pbs is calculated as an operation pressure Pac (=Pbs−P1). This predetermined pressure P1 is a pressure that corresponds to the amount of change in the fuel pressure PQ that occurs despite the needle valve 22 assuming the valve-closure position during the valve-opening drive or, the valve-closing drive of the fuel injection valve 20, that is, the amount of change in the fuel pressure PQ that does not contribute to the movement of the needle valve 22.

After that, a first-order differential value of the fuel pressure PQ during the period during which the fuel pressure PQ decreases immediately after the fuel injection starts to be executed is calculated. Then, a tangential line L1 of the time waveform of the fuel pressure PQ at a point at which the first-order differential value becomes minimum is found, and an intersection point A of the tangential line L1 and the operation pressure Pac is calculated. The timing that corresponds to a point AA that is earlier in time than the intersection point A by the amount of the detection delay of the fuel pressure PQ is specifically determined as a valve-opening operation start timing Tos. The foregoing detection delay is a duration that corresponds to a delay of the change timing of the fuel pressure PQ relative to the timing of pressure change in the nozzle chamber 25 (see FIG. 2) of the fuel injection valve 20, and is a delay that is attributed to the distance between the nozzle chamber 25 and the pressure sensor 41 and the like.

Besides, a first-order differential value of the fuel pressure PQ during a period during which the fuel pressure PQ rises after a temporal decrease that immediately follows the start of execution of the fuel injection is calculated. Then, a tangential line L2 of the time waveform of the fuel pressure PQ at the point at which the first-order differential value becomes maximum is found, and an intersection point B of the tangential line L2 and the operation pressure Pac is calculated. The timing that corresponds to a point BB that is earlier in time than the intersection point B by the amount of the detection delay is specifically determined as a valve-closing operation completion timing Tce.

Furthermore, an intersection point C of the tangential line L1 and the tangential line L2 is calculated, and a difference between the fuel pressure PQ at the intersection point C and the operation pressure Pac (i.e., a hypothetical pressure decline ΔP (=Pac−PQ)) is found. Besides, a multiplication product of the hypothetical pressure decline ΔP and a gain G1 that is set on the basis of the target fuel injection amount TQ and the target rail pressure Tpr is calculated as a hypothetical maximum fuel injection rate VRt (=ΔP×G1). Furthermore, a multiplication product of the hypothetical maximum fuel injection rate VRt and a gain G2 that is set on the basis of the target fuel injection amount TQ and the target rail pressure Tpr is calculated as a maximum injection rate R1 (=VRt×G2).

After that, the timing CC that is earlier in time than the intersection point C by the amount of the detection delay, and the point D at which the fuel injection rate is equal to the hypothetical maximum fuel injection rate VRt at the timing CC is specifically determined. Then, the timing that corresponds to an intersection point E of the maximum injection rate Rt and a straight line L3 that connects the point D and the valve-opening operation start timing Tos (more specifically, the point at which the fuel injection rate becomes "0" at the timing Tos) is specifically determined as a maximum injection rate attainment timing Toe.

Beside, the timing that corresponds to an intersection point F of the maximum injection rate R1 and a straight line L4 that connects the point D and the valve-closing operation completion timing Tee (specifically, the point at which the fuel injection rate becomes "0" at the timing Tce) is specifically determined as an injection rate decrease start timing Tcs.

Furthermore, a trapezoidal time waveform formed by the valve-opening operation start timing Tos, the maximum injection rate attainment timing Toe, the injection rate decrease start timing Tcs, the valve-closing operation completion timing Tce and the maximum injection rate Rt is used as a detection time waveform regarding the fuel injection rate for the pre-injection. Incidentally, in this embodiment, detection time waveforms regarding the main injection and the post-injection are detected in substantially the same detection manner as the detection time waveform regarding the pre-injection is detected, and the detection time waveforms thus detected are used in the fuel injection control. In this embodiment, the foregoing detection waveforms function as actual values regarding the execution periods of the fuel injections.

Besides, in the apparatus in accordance with this embodiment, in order to property execute the main injection and the post-injection in a manner commensurate with the state of operation of the engine 10, various control target values regarding the execution periods of the main injection and the post-injection are corrected on the basis of the detection waveforms of the fuel injection rate detected on the basis of the fuel pressure PQ.

The foregoing execution manner of correction will be described below by using as an example an execution manner in which control target values of the execution period of the main injection are corrected. Firstly, a basic value regarding the time waveform (basic time waveform) of the fuel injection rate for the main injection is set on the basis of the state of operation of the engine 10 such as the accelerator operation amount ACC, the engine rotation speed NE, etc. Incidentally, in this embodiment, a relation between the state of operation of the engine 10 and a basic time waveform suitable for the state of operation of the engine 10 is found beforehand on the basis of results of experiments or simulations, and is stored in the electronic control unit 40. Then, the electronic control unit 40 calculates a basic time waveform from the state of operation of the engine 10 at every given moment, on the basis of the pre-stored relation.

Figure 5:
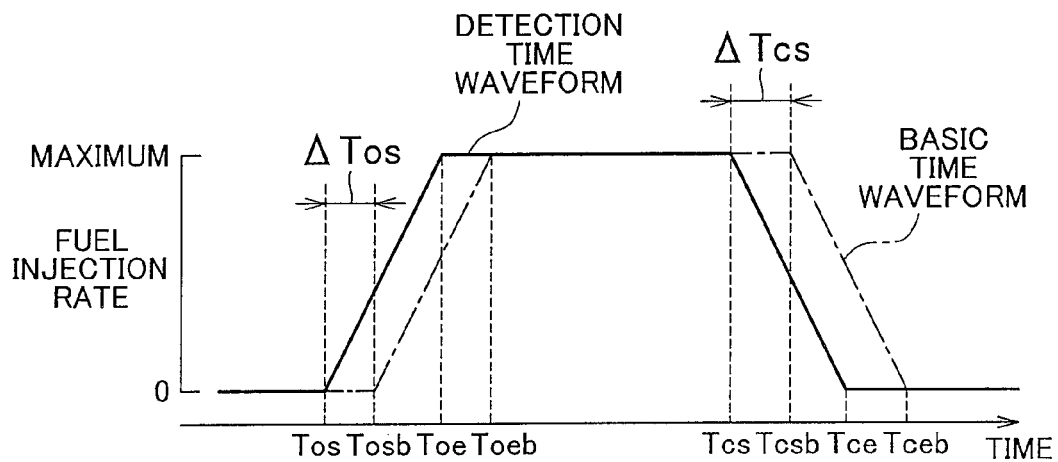
FIG. 5 is a time chart showing an example of a relation between a detection time waveform and a basic time waveform of the main injection in the fuel injection process of the engine.

FIG. 5 shows an example of a relation between a detection time waveform (solid line) and a basic time waveform (one-dot chain line) regarding the main injection. As shown in FIG. 5, the basic time waveform set herein is a trapezoidal time waveform that is defined by a valve-opening operation start timing Tosb, a maximum injection rate attainment timing Toeb, an injection rate decrease start timing Tcsb, a valve-closing operation completion timing Tceb and a maximum injection rate Rtb. Then, the basic time waveform and the detection time waveform are compared. On the basis of a result of the comparison, a correction term Km1 for correcting the control target value of the start timing of the main injection (the target main injection timing Tsm) and correction terms Km2 and Km3 for correcting the control target value of the execution duration of the main injection (the target main injection duration Ttm) are calculated. Concretely, the calculation of these correction terms Km1, Km2 and Km3 is performed as follows.

To calculate the correction term Km1, firstly a difference $\Delta$Tos between the valve-opening operation start timing Tosb on the basic time waveform and the valve-opening operation start timing Tos on the detection time waveform is calculated. Then, on the basis of this difference $\Delta$Tos as well as the target fuel injection amount TQ and the engine rotation speed NE, a value that is able to compensate for the difference $\Delta$Tos is calculated as the correction term Km1.

At the time of execution of the fuel injection control, a value obtained by adding the correction term Km1 to the target main injection timing Tsm that is calculated from the target fuel injection amount TQ and the engine rotation speed NE is calculated as a final target main injection timing Tsm. By calculating the target main injection timing Tsm in this manner, the departure between the valve-opening operation start timing Tosb on the basic time waveform and the valve-opening operation start timing Tos on the detection waveform can be restrained to a small amount, so that the start timing of the main injection can be accurately set in a manner commensurate with the state of operation of the engine 10.

On another hand, to calculate the correction term Km2, firstly a difference $\Delta$Tcs between the injection rate decrease start timing Tcsb on the basic time waveform and the injection rate decrease start timing Tcs on the detection time waveform is calculated. Then, on the basis of this difference $\Delta$Tcs as well as the target fuel injection amount TQ and the engine rotation speed NE, a value that is able to compensate for the difference $\Delta$Tcs is calculated as the correction term Km2.

Figure 6:
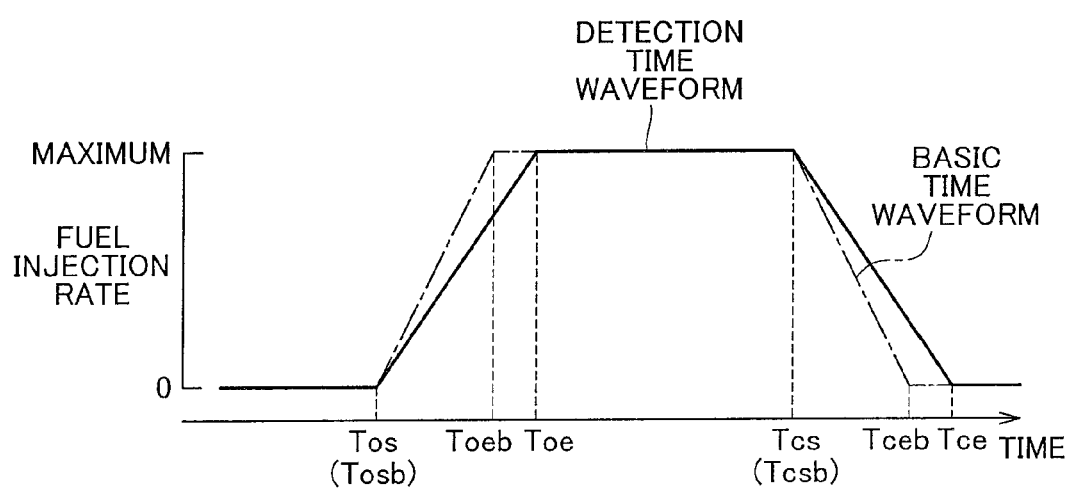
FIG. 6 is a time chart showing another example of the relation between the detection time waveform and the basic time waveform of the main injection in the fuel injection process of the engine.

FIG. 6 shows another example of the relation between the detection time waveform (solid line) and the basic time waveform (one-dot chain line) regarding the main injection. As shown in FIG. 6, to calculate the correction term Km3, firstly a difference in the speed of change in the fuel injection rate between the basic time waveform and the detection time waveform is calculated. Concretely, a difference $\Delta$Rup between the slope of a line segment that connects the valve-opening operation start timing Tos and the maximum injection rate attainment timing Toe and the slope of a line segment that connects the valve-opening operation start timing Tosb and the maximum injection rate attainment timing Toeb is calculated as a difference in the speed of increase in the fuel injection rate between the basic time waveform and the detection time waveform. A difference $\Delta$Rdn between the slope of a line segment that connects the injection rate decrease start timing Tcs and the valve-closing operation completion timing Tce and the slope of a line segment that connects the injection rate decrease start timing Tcsb and the valve-closing operation completion timing Tceb is calculated as a difference in the speed of decrease in the fuel injection rate between the basic time waveform and the detection time waveform. In this embodiment, the differences $\Delta$Rup and $\Delta$Rdn are calculated as values that highly correlate with the difference in area between the basic time waveform and the detection time waveform. Then, as the correction term Km3, a value that is able to compensate for a difference between the area of the basic time waveform (specifically, the area of a region defined by the fuel injection rate on the waveform and the line of a fuel injection rate of "0") and the area of the detection time waveform (the area of a region defined by the fuel injection rate on the waveform and the line of a fuel injection rate of "0") is calculated on the basis of the differences $\Delta$Rup and $\Delta$Rdn, the target fuel injection amount TQ and the engine rotation speed NE.

At the time of execution of the fuel injection control, a value obtained by adding the correction terms Km2 and Km3 to the target main injection duration Ttm that is calculated from the target fuel injection amount TQ and the engine rotation speed NE is calculated as a final target main injection duration Ttm.

By calculating the target main injection duration Ttm in this manner, the departure between the injection rate decrease start timing Tcsb on the basic time waveform and the injection rate decrease start timing Tcs on the detection waveform can be restrained to a small amount, so that the timing at which the fuel injection rate begins to decline in the main injection can be accurately set in a manner commensurate with the state of operation of the engine 10.

Incidentally, in the case where the speed of increase or the speed of decrease in the fuel injection rate is different between the basic time waveform and the detection time waveform although both the valve-opening start timing and the injection rate decrease start timing are the same between the basic time waveform and the detection time waveform, there is a possibility that the area of the basic time waveform and the area of the detection time waveform may be unequal and the fuel injection amount may depart from the amount that is appropriate for the state of operation of the engine 10. In this embodiment, however, the difference in area between the basic time waveform and the detection time waveform is restrained to a small amount due to the correction by the correction term Km3, so that the fuel injection amount in the main injection is accurately adjusted to an amount that is appropriate for the state of operation of the engine 10.

Incidentally, since the rail pressure control is executed, the amount of change of the valve-opening start timing in the case where the target main injection timing Tsm is changed by a fixed value or the amount of change in the fuel injection rate decrease start timing in the case where the target main injection duration Ttm is changed by a fixed value varies according to the rail pressure. In this embodiment, the foregoing rail pressure (specifically, the target fuel injection amount TQ and the engine rotation speed NE that are parameters for calculation of the target rail pressure Tpr) is adopted as a calculation parameter for use for calculating the correction terms Km1, Km2 and Km3. Therefore, the correction terms Km1, Km2 and Km3 can be properly calculated in a manner commensurate with the current rail pressure at every given moment.

Besides, in this embodiment, the various control target values regarding the execution period of the post-injection are corrected on the basis of the detection time waveform of the fuel injection rate that is detected on the basis of the fuel pressure PQ, similarly to the control target values regarding the execution period of the main injection. In this embodiment, the post-injection functions as a further succeeding injection that is executed following an interval after execution of the succeeding injection is completed.

Concretely, a basic time waveform regarding the post-injection is set on the basis of the state of operation of the engine 10. Then, on the basis of a result of comparison between the basic time waveform and the detection time waveform, a correction term Ka1 for correcting the control target value regarding the start timing of the post-injection (target post-injection timing TsaA) and correction terms Ka2 and Ka3 for correcting control target values regarding the execution duration of the post-injection (target post-injection duration TtaA) are calculated.

At the time of execution of the fuel injection control, a value obtained by adding the foregoing correction term Ka1 to the target post-injection timing TsaA that is calculated on the basis of the target fuel injection amount TQ and the engine rotation speed NE is calculated as a final target post-injection timing TsaA. Besides, a value obtained by adding the correction terms Ka2 and Ka3 to the target post-injection duration TtaA that is calculated on the basis of the target fuel injection amount TQ and the engine rotation speed NE is calculated as a final target post-injection duration TtaA.

Figure 7:
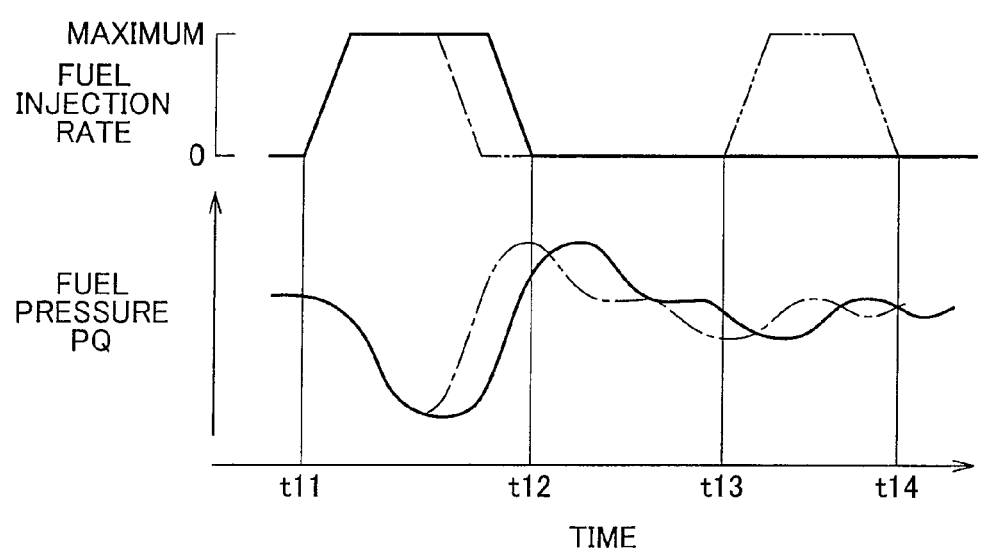
FIG. 7 is a time chart showing an example of the pressure pulsation that occurs in a fuel supply system in association with execution of the fuel injection of the engine.

As in an example shown in FIG. 7, when the fuel injection is executed (at time t11 to t12), the fuel pressure PQ fluctuates due to the pressure pulsation that occurs in the fuel supply system. Therefore, as is apparent from FIG. 7, if the fuel injection shown in the diagram is performed as a preceding injection and then the succeeding injection is executed as shown by a two-dot chain line in the diagram (time t13 to t14) and the manner of fluctuation of the fuel pressure PQ associated with execution of the succeeding injection is detected via the pressure sensor 41, the time waveform of the fuel pressure PQ becomes a waveform that includes amounts of fluctuation caused by the pressure pulsation that occurs in association with the execution of the preceding injection in addition to the amounts of fluctuation of the fuel pressure PQ associated with the execution of the succeeding injection. Therefore, if the detection time waveform is formed simply on the basis of the fuel pressure PQ at the time of execution of the multiple injection, there is a risk that the accuracy in formation of the detection time waveform may decline by an amount of fluctuation caused by pressure pulsation that is caused by execution of a preceding injection. Incidentally, in this embodiment, in the case where the pre-injection is executed, the pre-injection functions as a preceding injection, and the main injection functions as a succeeding injection. Besides, in the case where the post-injection is executed, the main injection functions as a preceding injection, and the post-injection functions as a succeeding injection.

In consideration of these circumstances, this embodiment is constructed so that at the time of execution of a succeeding injection, the amount of fluctuation caused by the pressure pulsation is removed from the fuel pressure PQ that is detected by the pressure sensor 41, and a detection time waveform is formed on the basis of the manner of fluctuation of the reduced fuel pressure PQ. Specifically, a correction time waveform that is able to cancel out the amount of fluctuation caused by the pressure pulsation is calculated on the basis of the target fuel injection amount TQ, the engine rotation speed NE and the injection interval. Then, the correction time waveform and the time waveform of the fuel pressure PQ are combined. Therefore, the detection time waveform is accurately formed on the basis of the value obtained by the removal of the amount of fluctuation caused by the pressure pulsation that occurs in association with execution of the preceding injection, so that the control target values regarding the execution period of the succeeding injection can be accurately corrected on the basis of the detection time waveform.

In the example shown in FIG. 7, during a period during which there is possibility that a succeeding injection may be executed (time t13 to t14), there can be different manners of fluctuation of the fuel pressure PQ, that is, a manner of fluctuation resulting from execution of the preceding injection shown by a solid line in FIG. 7, and a manner of fluctuation resulting from execution of the preceding injection shown by a one-dot chain line in FIG. 7. As is apparent from this diagram, even if the manner of the pressure pulsation that occurs in the fuel supply system in association with execution of the main injection is fixed, variation of the injection interval between the main injection and the post-injection causes variation of effects of the pressure pulsation during execution of the post-injection, and therefore results in variation of the manner of fluctuation of the fuel pressure in the fuel supply system. Therefore, variation of the injection interval causes, for example, a decline in the calculation accuracy of the correction time waveform, which in turn causes a decline in the formation accuracy of the detection time waveform regarding the post-injection. Thus, variation of the injection interval results in variation of the effect of the pressure pulsation on the fuel injection amount of the post-injection. Hence, in order to properly adjust the fuel injection amount of the post-injection after taking the effect of the pressure pulsation into consideration, it is critical to accurately grasp the actual injection interval.

In this embodiment, for execution of the post-injection, a target post-injection timing TsaA and a target post-injection duration TtaA are calculated on the basis of the state of operation of the engine 10, and the fuel injection valve 20 is driven to open so that an execution period determined by the target post-injection timing TsaA and the target post-injection duration TtaA and the actual execution time are equal to each other. Specifically, the injection interval between the main injection and the post-injection is set by an expectation-based control that is performed on the basis of the state of operation of the engine 10.

Therefore, in the case where a control target value regarding the execution period of the main injection is executed, it sometimes happens that the injection interval needlessly changes. Specifically, since the correction of the target main injection timing Tsm by the correction term Km1 and the correction of the target main injection duration Ttm by the correction term Km2 are executed so that the basic time waveform and the detection time waveform regarding the fuel injection rate become equal, execution of these corrections does not easily change the injection interval between the main injection and the post-injection. On the other hand, the correction of the target main injection duration Ttm by the correction term Km3 is executed so as to cause departures in the injection rate decrease start timing and the valve-closing operation completion timing between the basic time waveform and the detection time waveform regarding the fuel injection so that the area of the basic time waveform and the area of the detection time waveform become equal. Therefore, in the case where the target main injection duration Ttm is changed through the foregoing correction, the injection interval between the main injection and the post-injection changes.

Thus, if the target main injection duration Ttm is corrected by the correction term Km3, there occurs a departure between the injection interval between the main injection and the post-injection that is expected from the state of operation of the engine 10 and the actual injection interval therebetween. In this case, the correction time waveform calculated for the formation of the detection time waveform regarding the post-injection departs from a waveform that is able to properly remove the amount of fluctuation of the fuel pressure PQ caused by the pressure pulsation. This departure becomes a factor that lowers the accuracy of the adjustment of the fuel injection amount of the post-injection.

In consideration of this respect, in this embodiment, in the case where the target main injection duration Ttm is corrected by the correction term Km3, the correction term Km3 is reflected in the injection interval for use for the calculation of the correction time waveform (specifically, a required value of the injection interval used in the previous execution of the post-injection).

Due to this, the correction time waveform is calculated on the basis of a value that is close to the actual injection interval, so that the detection time waveform can be accurately formed on the basis of the correction time waveform. Then, by setting the target post-injection timing TsaA and the target post-injection duration TtaA on the basis of the comparison between the detection time waveform and the basic time waveform, the execution period of the post-injection is properly set in a manner commensurate with the effect of the pressure pulsation in the fuel supply system at the time of execution of the post-injection. Incidentally, as for the apparatus of this embodiment, the accuracy in setting the injection interval between the main injection and the post-injection is not considered very important, and the accuracy in adjusting the fuel injection amount at the time of the post-injection is considered important.

A process of calculating control target values regarding the execution period of each injection (a calculation process) and a process of correcting control target values regarding the execution periods of the main injection and of the post-injection (a correction process) will be described in detail.

Figure 8:
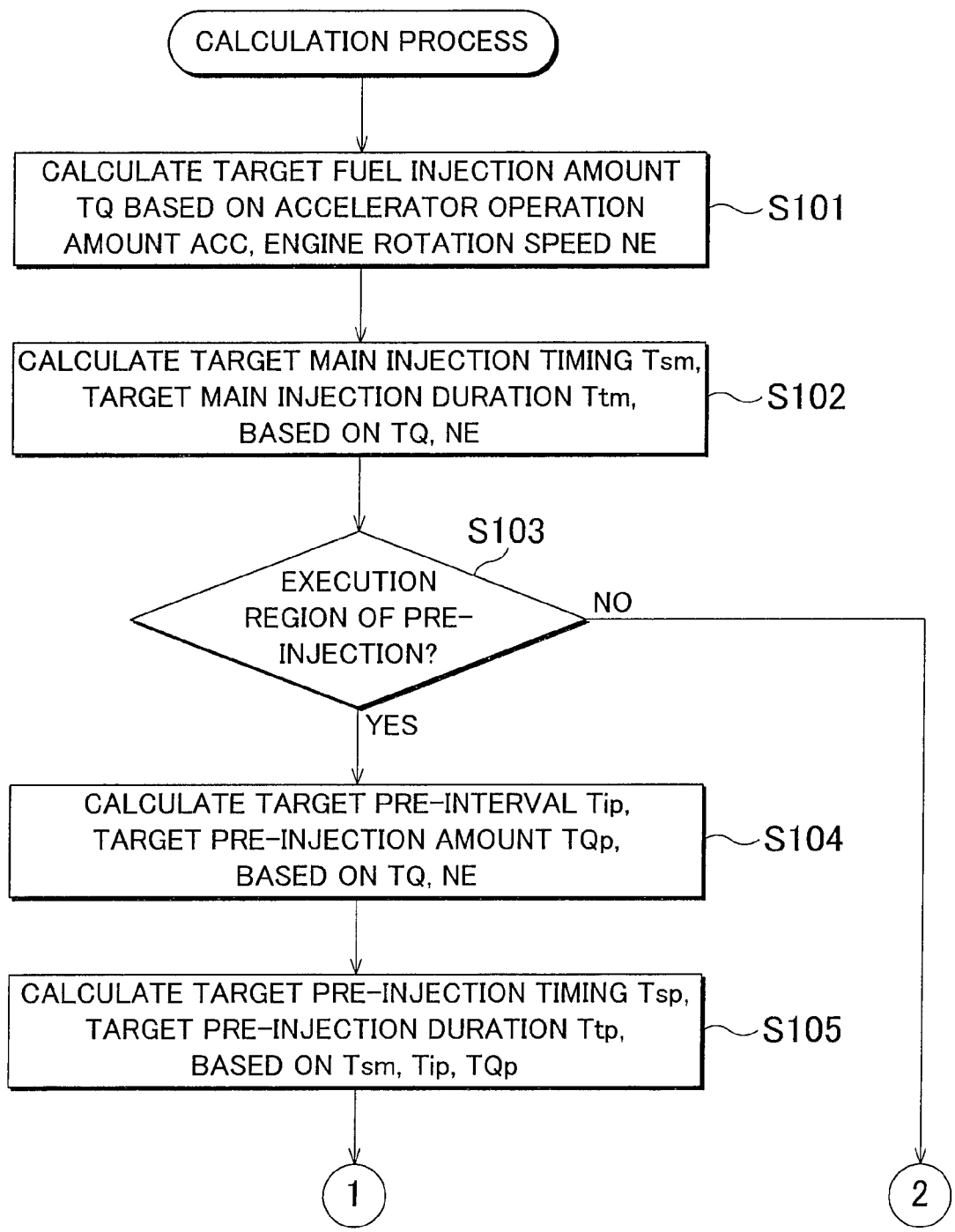
FIG. 8 is a flowchart showing a processing procedure of a calculation process in accordance with the first embodiment.
Figure 9:
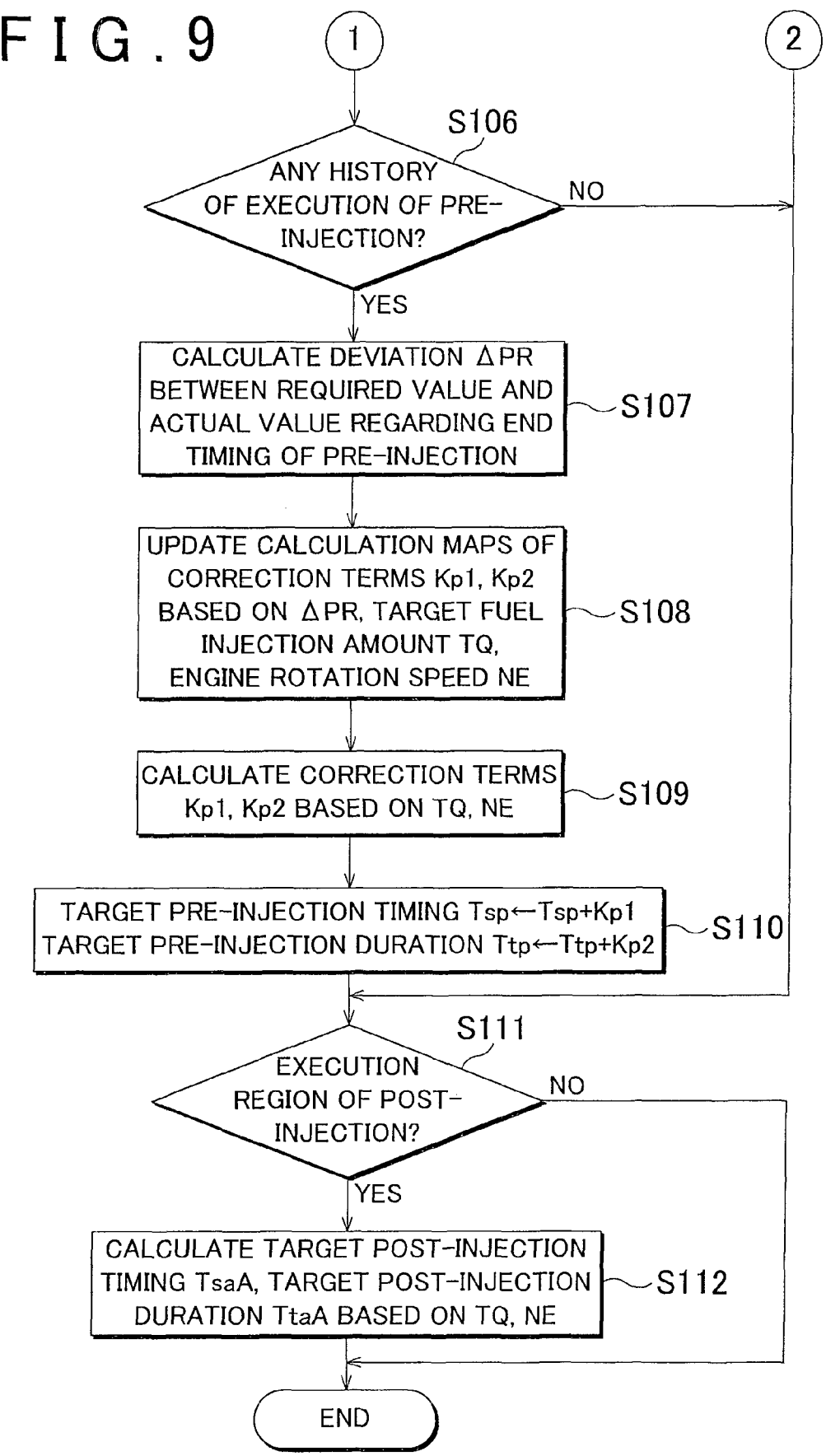
FIG. 9 is a flowchart showing a processing procedure of the calculation process that continues from the procedure shown in FIG. 8.

Firstly, with reference to FIG. 8 and FIG. 9, a processing procedure of the foregoing calculation process will be described in detail. Incidentally, FIGS. 8 and 9 are flowcharts concretely showing a processing procedure of the calculation process. The series of processes shown in the flowcharts is executed by the electronic control unit 40 as an interrupt process at every predetermined period.

As shown in FIG. 8, firstly in this process, a target fuel injection amount TQ is calculated on the basis of the accelerator operation amount ACC and the engine rotation speed NE (step S101). Incidentally, in this embodiment, a relation between the state of operation of the engine 10 determined by the accelerator operation amount ACC and the engine rotation speed NE and the target fuel injection amount TQ that is suitable to the state of operation of the engine 10 is found beforehand on the basis of results of experiments or simulations, and is stored in the electronic control unit 40. In the process of step S101, the target fuel injection amount TQ is calculated on the basis of the pre-stored relation.

Besides, on the basis of the target fuel injection amount TQ and the engine rotation speed NE, a target main injection timing Tsm and a target main injection duration Ttm are calculated (step S102). In this embodiment, a relation between the state of operation of the engine 10 determined by the target fuel injection amount TQ and the engine rotation speed NE and the target main injection timing Tsm that is suitable to the state of operation of the engine 10, and a relation between the state of operation of the engine 10 and the target main injection duration Ttm that is suitable to the state of operation are found beforehand on the basis of results of experiments and simulations, and are stored in the electronic control unit 40. In the process of step S102, the target main injection timing Tsm and the target main injection duration Ttm are individually calculated on the basis of their respective relations.

After that, it is determined whether or not the present region of operation of the engine 10 is a region in which the pre-injection is executed (step S103). Then, if the present region of operation is the region in which the pre-injection is executed (YES in step S103), a process of calculating control target values regarding the execution period of the pre-injection is executed.

Firstly, a target pre-interval Tip and a target pre-injection amount TQp are calculated on the basis of the target fuel injection amount TQ and the engine rotation speed NE (step S104). In this embodiment, a relation between the state of operation of the engine 10 determined by the target fuel injection amount TQ and the engine rotation speed NE and the target pre-interval Tip that is suitable to the state of operation of the engine 10, and a relation between the state of operation of the engine 10 and the target pre-injection amount TQp are found beforehand on the basis of results of experiments or simulations, and are stored in the electronic control unit 40. In the process of step S104, the target pre-interval Tip and the target pre-injection amount TQp are individually calculated on the basis of their respective relations. Incidentally, as the target pre-interval Tip, a control target value regarding the interval between the start timing of the pre-injection and the start timing of the main injection is calculated.

After that, a target pre-injection timing Tsp and a target pre-injection duration Ttp are calculated on the basis of the target main injection timing Tsm, the target pre-interval Tip and the target pre-injection amount TQp (step S105). In this embodiment, a relation between the state of operation of the engine 10 determined by the target main injection timing Tsm, the target pre-interval Tip and the target pre-injection amount TQp and the target pre-injection timing Tsp that is suitable to the state of operation of the engine 10, and a relation between the state of operation of the engine 10 and the target pre-injection duration Ttp are found beforehand on the basis of results of experiments or simulations, and are stored in the electronic control unit 40. In the process of step S105, the target pre-injection timing Tsp and the target pre-injection duration Ttp are individually calculated on the basis of their respective relations.

After that, it is determined whether or not there is a history of execution of the pre-injection (step S106 in FIG. 9). Then, if there is a history of execution of the pre-injection (YES in step S106), a deviation between the required value and the actual value of the end timing of the pre-injection (a deviation ΔPR as mentioned above (see FIG. 3)) is calculated on the basis of the manner of fluctuation of the fuel pressure PQ detected at the time of the previous execution of the pre-injection (step S107). Concretely, a detection time waveform is formed on the basis of the manner of fluctuation of the fuel pressure PQ, and a difference between the valve-closing operation completion timing Tce (actual value) on the detection time waveform and the end timing (required value) of the pre-injection determined by the target pre-injection timing Tsp and the target pre-injection duration Ttp is calculated as the deviation ΔPR. In this embodiment, the process of step S107 functions as a deviation calculation portion.

Then, on the basis of the deviation ΔPR, a calculation map for calculating a correction term Kp1 that corrects the target pre-injection timing Tsp, and a calculation map for calculating a correction term Kp2 that corrects the target pre-injection duration Ttp are updated (step S108). Concretely, values (provisional values VR1 and VR2) that are able to compensate for the difference AR are calculated on the basis of the deviation ΔPR, the target fuel injection amount TQ and the engine rotation speed NE. Then, values that are gently changed, on the basis of the provisional values VR1 and VR2, from map values (of the correction term Kp1 and the correction term Kp2) that correspond to the state of operation of the engine 10 that is determined on the basis of the target fuel injection amount TQ and the engine rotation speed NE, are stored as new map values in their respective calculation maps. These new map values are, for example, values that satisfy the following relational expressions:

Correction term $Kp1 \leftarrow$ stored correction term $Kp1+$ provisional value $VR1 \times n$ Correction term $Kp2 \leftarrow$ stored correction term $Kp2+$ provisional value $VR2 \times n$ where $0<n<1$ After that, the correction terms Kp1 and Kp2 are calculated on the basis of the target fuel injection amount TQ and the engine rotation speed NE (step S109). Then, a value obtained by adding the correction term Kp1 to the target pre-injection timing Tsp (the value=Tsp+Kp1) is set as a final target pre-injection timing Tsp, and a value obtained by adding the correction term Kp2 to the target pre-injection duration Ttp (the value=Ttp+Kp2) is set as a final target pre-injection duration Ttp (step S110).

Thus, by calculating the correction terms Kp1 and Kp2 as gently changed values (the foregoing provisional values VR1 and VR2) that are appropriate for the deviation ΔPR, sharp changes of the correction terms Kp1 and Kp2 can be restrained. Therefore, even in the case where a value that has a risk of lowering the accuracy in setting the correction terms Kp1 and Kp2 due to the effects of noise or sharp changes in the state of operation of the engine 10, a decline in the calculation accuracy of the correction terms Kp1 and Kp2 which results from the calculated deviation ΔPR can be restrained. This makes it possible to restrain the decline in the accuracy in setting the target pre-injection timing Tsp or the target pre-injection duration Ttp. Incidentally, in this embodiment, the target pre-injection timing Tsp and the target pre-injection duration Ttp that are calculated in the process of step S105 (FIG. 8) function as control basic values regarding the execution period of the preceding injection, and the target pre-injection timing Tsp and the target pre-injection duration Ttp that are set in the process of step S110 (FIG. 9) function as control target values regarding the execution period of the preceding injection. Besides, the process of step S103 (FIG. 8) to step S110 (FIG. 9) functions as a preceding injection setting portion.

On the other hand, in the case where there is no history of execution of the pre-injection (NO in step S106), neither the process of updating the calculation maps nor the process of correcting the target pre-injection timing Tsp and the target pre-injection duration Ttp is executed (i.e., the process of step S107 to step S110 is skipped). In this case, the values calculated in the process of step S105 (FIG. 8) are set as a final target pre-injection timing Tsp and a final target pre-injection duration Ttp.

In the case where the region of operation of the engine 10 is not a region in which the pre-injection is executed (NO in step S103), the process of setting the control target values of the execution period of the pre-injection is not executed (i.e., the process of step S104 to S110 is skipped).

After the process of setting the control target values regarding the execution period of the pre-injection is executed in the foregoing manner, it is determined whether or not the state of operation of the engine 10 is in a region in which the post-injection is executed (step S111 in FIG. 9).

In the case where the region of operation of the engine 10 is a region in which the post-injection is executed (YES in step S111), a target post-injection timing TsaA and a target post-injection duration TtaA are calculated from the target fuel injection amount TQ and the engine rotation speed NE (step S112). In this embodiment, a relation between the state of operation of the engine 10 determined by the target fuel injection amount TQ and the engine rotation speed NE and the target post-injection timing TsaA suitable to the state of operation of the engine 10, and a relation between the state of operation of the engine 10 and the target post-injection duration TtaA are found beforehand on the basis of results of experiments or simulations, and are stored in the electronic control unit 40. In the process of step S112, the target post-injection timing TsaA and the target post-injection duration TtaA are individually calculated on the basis of their respective relations.

In the case where the region of operation of the engine 10 is not a region in which the post-injection is executed (NO in step S111), the process of setting a control target value regarding the execution period of the post-injection is not executed (i.e., the process of step S112 is skipped), and the process of the flowchart is temporarily ended.

As described above, in the calculation processes in accordance with this embodiment, the control target values regarding the start timings of the injections (the target pro-injection timing Tsp, the target main injection timing Tsm, and the target post-injection timing TsaA) are calculated, and the control target values regarding the execution durations of the injections (the target pre-injection duration Ttp, the target main injection duration Ttm and the target post-injection duration TtaA) are calculated.

Then, in the fuel injection control, while taking into account the time from when the electronic control unit 40 outputs a valve-opening signal till when the valve-opening operation of the fuel injection valve 20 (i.e., the valve opening delay time), the electronic control unit 40 outputs the valve-opening signal to the fuel injection valve 20 separately for each injection at a timing such that the actual start timing and the control target value regarding the start timing can be made to coincide with each other. Besides, while taking into account the time from when the electronic control unit 40 outputs a valve-closing signal till when the closing operation of the fuel injection valve 20 starts (i.e., the valve closure delay time), the electronic control unit 40 outputs the valve-closing signal to the fuel injection valve 20 separately for each injection at a timing such that the actual execution duration and the control target value regarding the execution duration (concretely, the time from the valve-opening operation start timing to the injection rate decrease start timing) can be made equal to each other. Through execution of the foregoing fuel injection control as described above, an amount of fuel that is appropriate for the state of operation of the engine 10 at every given moment is injected from each fuel injection valve 20 in an injection pattern suitable for the state of operation of the engine 10, and then is supplied into the corresponding cylinder 11 of the engine 10.

Figure 10:
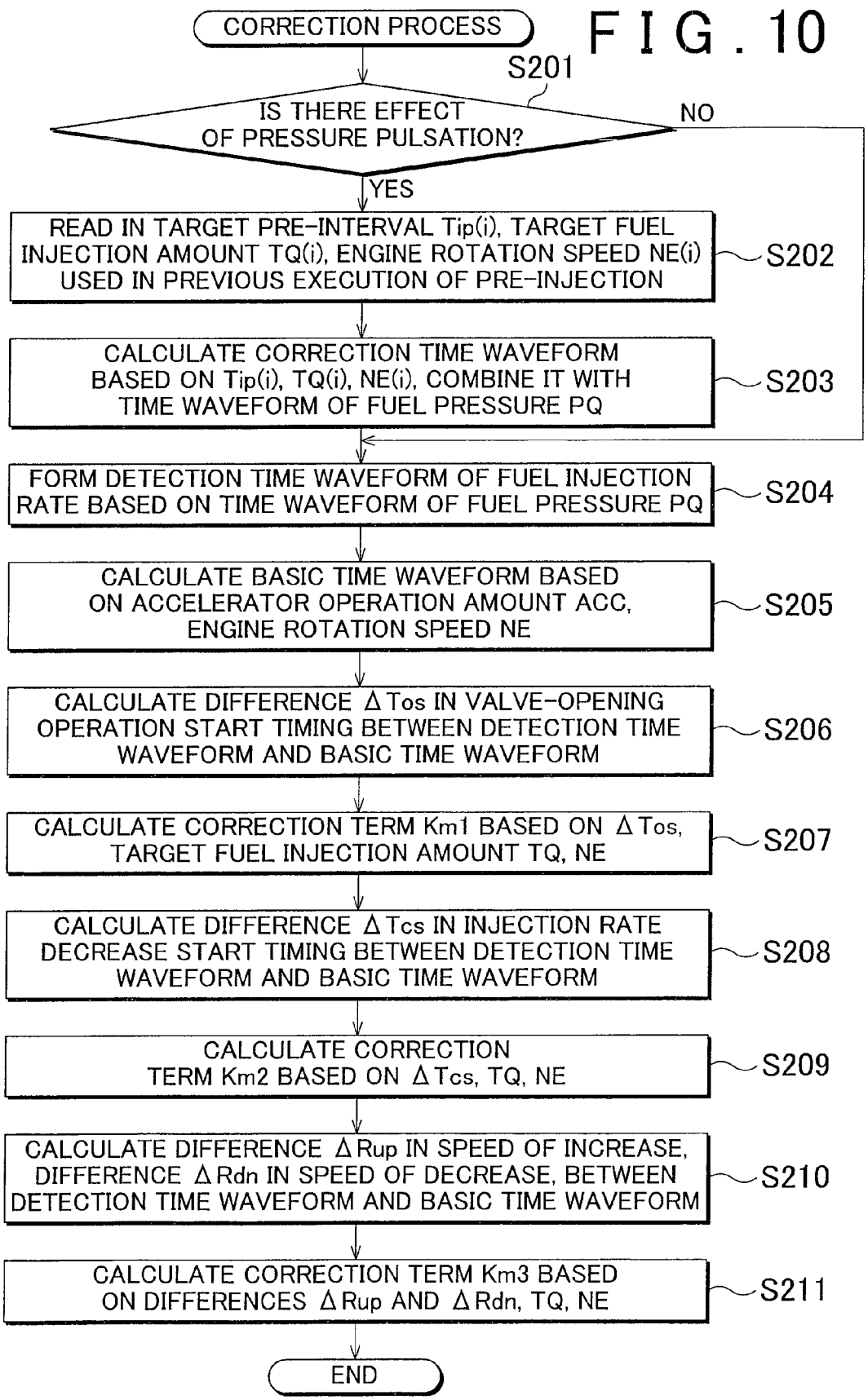
FIG. 10 is a flowchart showing a processing procedure of a correction process in accordance with the first embodiment.
Figure 11:
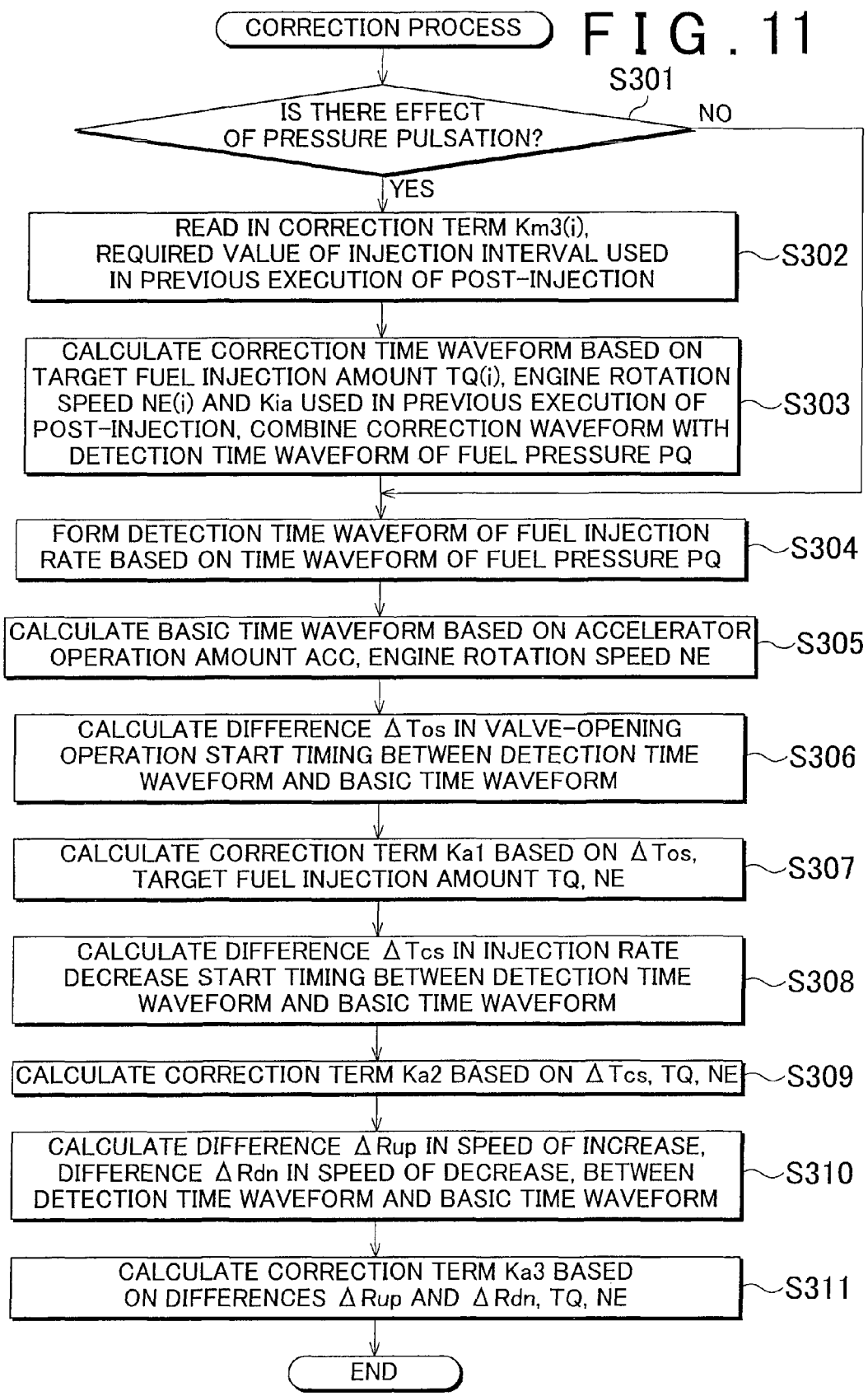
FIG. 11 is a flowchart showing another processing procedure of a correction process in accordance with the first embodiment.

Next, with reference to FIG. 10 and FIG. 11, processing procedures of the foregoing correction processes will be described in detail. Incidentally, FIG. 10 and FIG. 11 are flowcharts showing concrete processing procedures of the correction processes. The series of processes shown in each of the flowcharts is executed by the electronic control unit 40 as an interrupt process at every predetermined period. FIG. 10 shows a processing procedure of a process of correcting the control target values regarding the execution period of a main injection (i.e., the target main injection timing Tsm and the target main injection duration Ttm) in the case where the main injection is executed as a succeeding injection following the execution of a pre-injection as a preceding injection. FIG. 11 shows a processing procedure of a process for correcting the control target values regarding the execution period of a post-injection (i.e., the target post-injection timing TsaA and the target post-injection duration TtaA) in the case where the post-injection is executed as a succeeding injection following the execution of a main injection as a preceding injection.

Firstly, a processing procedure of the correction process for correcting the control target values regarding the execution period of the main injection will be described with reference to FIG. 10. As shown in FIG. 10, in the process of correcting the control target values regarding the execution period of the main injection, firstly it is determined whether or not the present situation is a situation in which there is effect of the pressure pulsation that occurs in association with execution of the pre-injection (step S201). In this step, whether or not execution of the main injection is about to start while the fuel pressure PQ is fluctuating due to the pressure pulsation that occurs in association with execution of the pre-injection is determined on the basis of the engine rotation speed NE and the target pre-interval Tip.

If it is determined that the present situation is a situation in which there is effect of the pressure pulsation (YES in step S201), the target pre-interval Tip, the target fuel injection amount TQ(i) and the engine rotation speed NE(i) that are used in the previous execution of the pre-injection are read in (step S202). After that, the correction time waveform is calculated on the basis of the target pre-interval Tip(i), the target fuel injection amount TQ(i) and the engine rotation speed NE(i), and this correction time waveform is combined with the time waveform of the fuel pressure PQ that is detected at the time of the previous execution of the main injection (step S203).

On the other hand, if it is determined that the present situation is a situation in which there is no effect of the pressure pulsation (NO in step S201), neither the process of calculating the correction time waveform nor the process of combining the correction time waveform with the time waveform of the fuel pressure PQ is executed (i.e., the process of steps S202 and S203 is skipped).

After that, a detection time waveform for the main injection is formed on the basis of the time waveform of the fuel pressure PQ (step S204). Then, a basic time waveform for the main injection is set on the basis of the accelerator operation amount ACC and the engine rotation speed NE (step S205). Then, the detection time waveform and the basic time waveform are compared.

Then, a difference ΔTos between the valve-opening operation start timing Tosb on the basic time waveform and the valve-opening operation start timing Tos on the detection time waveform is calculated (step S206), and the correction term Km1 is calculated on the basis of the difference ΔTos, the target fuel injection amount TQ and the engine rotation speed NE (step S207). In this embodiment, a relation between the situation that is determined by the difference ΔTos, the target fuel injection amount TQ and the engine rotation speed NE and the correction term Km1 that is able to precisely compensate for the difference ΔTos is found beforehand on the basis of results of experiments or simulations, and is stored in the electronic control unit 40. On the basis of this relation, the correction term Km1 is calculated in the process of step S207.

Besides, a difference ΔTcs between the injection rate decrease start timing Tcsb on the basic time waveform and the injection rate decrease start timing Tcs on the detection time waveform is calculated (step S208). Then, the correction term Km2 is calculated on the basis of the difference ΔTcs, the target fuel injection amount TQ and the engine rotation speed NE (step S209). In this embodiment, a relation between the situation that is determined by the difference ΔTcs, the target fuel injection amount TQ and the engine rotation speed NE and the correction term Km2 that is able to precisely compensate for the difference ΔTcs is found beforehand on the basis of results of experiments and simulations, and is stored in the electronic control unit 40. On the basis of this relation, the correction term Km2 is calculated in the process of step S209.

Furthermore, a difference ΔRup in the speed of increase in the fuel, injection rate between the basic time waveform and the detection time waveform and a difference ΔRdn in the speed of decrease in the fuel injection rate therebetween are calculated (step S210). Then, the correction term Km3 is calculated on the basis of the difference ΔRup, the difference ΔRdn, the target fuel injection amount TQ and the engine rotation speed NE (step S211). In this embodiment, a relation between the situation that is determined by the differences ΔRup and ΔRdn, the target fuel injection amount TQ and the engine rotation speed NE and the correction term Km3 that is able to precisely compensate for a difference in area between the basic time waveform and the detection time waveform is found beforehand on the basis of results of experiments and simulations, and is stored in the electronic control unit 40. Then, on the basis of this relation, the correction term Km3 is calculated in the process of step S211.

After the correction terms Km1, Km2 and Km3 are calculated as described above, this process is temporarily ended. Then, the target main injection timing Tsm is corrected by the correction term Km1, and the target main injection duration Ttm is corrected by the correction terms Km2 and Km3, so that the execution period of the main injection and the fuel injection amount provided by the main injection will be properly set so as to be appropriate for the state of operation of the engine 10.

Next, the correction process for correcting the control target values regarding the execution period of the post-injection will be described with reference to FIG. 11. As shown in FIG. 11, in the process of correcting the control target values regarding the execution period of the post-injection, firstly it is determined whether or not the present situation is a situation in which there is effect of the pressure pulsation that occurs in association with execution of the main injection (step S301). In this step, whether or not execution of the post-injection is about to start while the fuel pressure PQ is fluctuating due to the pressure pulsation that occurs in association with execution of the main injection is determined on the basis of the accelerator operation amount ACC and the engine rotation speed NE.

If it is determined that the present situation is a situation in which there is effect of the pressure pulsation (YES in step S301), the required value of the injection interval between the main injection and the post-injection used in the previous execution of the post-injection, and the correction term Km3 (i) are read in, and a value Kia obtained by adding the correction term Km3(i) to the required value of the injection interval is calculated (step S302). Incidentally, the required value of the injection interval is a value that corresponds to the injection interval that is determined by the target main injection timing Tsm, the target main injection duration Ttm and the target post-injection timing TsaA.

After that, the correction time waveform is calculated on the basis of the target fuel injection amount TQ(i), the engine rotation speed NE(i) and the foregoing value Kia, and this correction time waveform is combined with the time waveform of the fuel pressure PQ that is detected at the time of the previous execution of the main injection (step S303).

On the other hand, if it is determined that the present situation is a situation in which there is no effect of the pressure pulsation (NO in step S301), neither the process of calculating the correction time waveform nor the process of combining the correction time waveform with the time waveform of the fuel pressure PQ is executed (i.e., the process of steps S302 and S303 is skipped).

After that, a detection time waveform for the post-injection is formed on the basis of the time waveform of the fuel pressure PQ (step S304). Then, a basic time waveform for the post-injection is set on the basis of the accelerator operation amount ACC and the engine rotation speed NE (step S305). Then, the detection time waveform and the basic time waveform are compared.

Then, a difference ΔTos between the valve-opening operation start timing Tosb on the basic time waveform and the valve-opening operation start timing Tos on the detection time waveform is calculated (step S306), and the correction term Ka1 is calculated on the basis of the difference ΔTos, the target fuel injection amount TQ and the engine rotation speed NE (step S307). In this embodiment, a relation between the situation that is determined by the difference ΔTos, the target fuel injection amount TQ and the engine rotation speed NE and the correction term Ka1 that is able to precisely compensate for the difference ΔTos is found beforehand on the basis of results of experiments or simulations, and is stored in the electronic control unit 40. On the basis of this relation, the correction term Ka1 is calculated in the process of step S307.

Besides, a difference ΔTcs between the injection rate decrease start timing Tcsb on the basic time waveform and the injection rate decrease start timing Tcs on the detection time waveform is calculated (step S308). Then, the correction term Ka2 is calculated on the basis of the difference ΔTcs, the target fuel injection amount TQ and the engine rotation speed NE (step S309). In this embodiment, a relation between the situation that is determined by the difference ΔTcs, the target fuel injection amount TO and the engine rotation speed NE and the correction term Ka2 that is able to precisely compensate for the difference ΔTcs is found beforehand on the basis of results of experiments and simulations, and is stored in the electronic control unit 40. On the basis of this relation, the correction term Ka2 is calculated in the process of step S309.

Furthermore, a difference ΔRup in the speed of increase in the fuel injection rate between the basic time waveform and the detection time waveform and a difference ΔRdn in the speed of decrease in the fuel injection rate therebetween are calculated (step S310). Then, the correction term Ka3 is calculated on the basis of the difference ΔRup, the difference ΔRdn, the target fuel injection amount TQ and the engine rotation speed NE (step S311). In this embodiment, a relation between the situation that is determined by the differences ΔRup and ΔRdn, the target fuel injection amount TQ and the engine rotation speed NE and the correction term Ka3 that is able to precisely compensate for a difference in area between the basic time waveform and the detection time waveform is found beforehand on the basis of results of experiments or simulations, and is stored in the electronic control unit 40. Then, on the basis of this relation, the correction term Ka3 is calculated in the process of step S311.

After the correction terms Ka1, Ka2 and Ka3 are calculated as described above, this process is temporarily ended. Then, the target post-injection timing TsaA is corrected by the correction term Ka1, and the target post-injection duration TtaA is corrected by the correction terms Ka2 and Ka3, so that the execution period of the post-injection and the fuel injection amount provided by the post-injection will be properly set so as to be appropriate for the state of operation of the engine 10.

In this embodiment, the correction process shown in FIG. 10 functions as a correction portion, and the process of step S302 in FIG. 11 functions as a required value calculation portion, and the process of steps S303 to S311 in FIG. 11 functions as a further succeeding injection setting portion.

In this embodiment, the calculation processes and the correction processes regarding the fuel injection are executed on the basis of the output signals of the pressure sensors 41 that correspond individually to the cylinders 11 (#1 to #4) of the engine 10; for example, the calculation processes and the correction processes regarding the fuel injection to the cylinder 11 (#1) of the engine 10 are executed on the basis of the detection signal from the pressure sensor 41 that is provided for the cylinder 11 (#1).

Therefore, in the multi-cylinder engine 10 in which the actuation characteristics of the fuel injection valves 20 vary from one cylinder to another due to their initial individual product differences or their differences in the time-dependent changes, the injection interval between the pre-injection and the main injection in the fuel injection process performed by each fuel injection valve 20 can be accurately set on the basis of the fuel pressure PQ detected by a corresponding one of the pressure sensors 41 that are provided individually for each cylinder. Due to this, the injection interval in the fuel injection of each cylinder 11 can be set with high accuracy, so that variations of the injection interval among the cylinders 11 can be restrained.

Furthermore, the correction terms Km1, Km2 and Km3 for correcting the control target values regarding the execution period of the main injection and the correction terms Ka1, Ka2 and Ka3 for correcting the control target values regarding the execution period of the post-injection can also be accurately set on the basis of the fuel pressure PQ detected by each one of the pressure sensors 41 dedicated to the corresponding cylinders 11. Therefore, the setting of the target main injection timing Tsm, the target main injection duration Ttm, the target post-injection timing TsaA and the target post-injection duration TtaA can be appropriately preformed separately for each cylinder 11 in a manner commensurate with the actuation characteristic of the fuel injection valve 20 of the cylinder 11.

Therefore, according to this embodiment, it becomes possible to properly set the execution period of the fuel injection and the fuel injection amount for each cylinder 11 while restraining variations among the cylinders 11.

As described above, according to this embodiment, effects as stated below can be attained.

(1) The deviation ΔPR between a required value and an actual value of the end timing of the pre-injection is calculated on the basis of the manner of fluctuation of the fuel pressure PQ, and then the target pre-injection timing Tsp and the target pre-injection duration Ttp are set on the basis of the target main injection timing Tsm and the target pre-interval Tip that are set on the basis of the deviation ΔPR and the state of operation of the engine 10. Therefore, values that are able to precisely restrain unnecessary changes in the actual execution period of the pre-injection can be set as the target pre-injection timing Tsp and the target pre-injection duration Ttp. Therefore, it becomes possible to accurately adjust the injection interval at the time of execution of the multiple injection, independently of the initial individual product differences and the time-dependent changes in the fuel supply system.

(2) A deviation between a required value and an actual value of the end timing of the pre-injection is calculated as the deviation ΔPR. Therefore, it is possible to set the target pre-injection timing Tsp and the target pre-injection duration Ttp while taking into account the departure of the actual end timing of the pre-injection. Due to this, the injection interval can be appropriately set so that the interval between the end timing of the pre-injection and the start timing of the main injection, which is particularly important in the execution of the pre-injection, will become a value that is appropriate for actual conditions.

(3) The target pre-injection timing Tsp and the target pre-injection duration Ttp are adopted as control target values regarding the execution period of the pre-injection which are calculated on the basis of the deviation ΔPR, the target main injection timing Tsm and the target pre-interval Tip. Therefore, it is possible to properly set the target pre-injection timing Tsp and the target pre-injection duration Ttp while taking the deviation ΔPR into account, and it is possible to set a timing that is able to restrain the deviation ΔPR to a small amount as the end timing of the pre-injection determined automatically by the target pre-injection timing Tsp and the target pre-injection duration Ttp. Due to this, it becomes possible to appropriately set the interval between the end timing of the pre-injection and the start timing of the main injection.

(4) The target pre-injection timing Tsp and the target pre-injection duration Ttp are set on the basis of the rail pressure. Therefore, through the setting of the target pre-injection duration Ttp and the target pre-injection timing Tsp, the injection interval between the pre-injection and the main injection can, be properly set, and the fuel injection amount by the pre-injection can also be properly set.

(5) Values that are gently changed from values (provisional values VR1 VR2) that are able to compensate for the deviation ΔPR are calculated as correction terms Kp1 and Kp2, so that sharp changes of the correction terms Kp1 and Kp2 can be restrained. Therefore, even in the case where a value that has a possibility of lowering the accuracy in setting the correction terms Kp1 and Kp2 is calculated as a deviation ΔPR, the decline in the calculation accuracy of the correction terms Kp1 and Kp2 caused by that value can be restrained, so that decline in the accuracy in setting the target pre-injection timing Tsp and the target pre-injection duration Ttp can be restrained.

(6) In the case where the correction of the target main injection duration Ttm by the correction term Km3 is executed, the correction term Km3 is reflected in the required value of the injection interval for use for calculation of the correction time waveform. Due to this, it becomes possible to calculate the correction time waveform on the basis of a value that is close to the actual injection interval, so that the detection time waveform can be accurately formed on the basis of the correction time waveform. Then, by setting the target post-injection timing TsaA and the target post-injection duration TtaA on the basis of results of comparison between the detection time waveform and the basic time waveform, it becomes possible to properly set the execution period of the post-injection in a manner commensurate with the effect of the pressure pulsation occurring in the fuel supply system at the time of execution of the post-injection.

(7) As the fuel injection valves 20, ones that are each provided integrally with a pressure sensor 41 that outputs a signal commensurate with the fuel pressure PQ in the introduction passageway 27 is adopted. Therefore, in comparison with an apparatus that detects the fuel pressure at a location remote from the fuel injection valves 20, for example, the fuel pressure in the common rail 34, the apparatus of this embodiment is able to detect the fuel pressure at a site near the injection hole 23 of each fuel injection valve 20. Therefore, the period of actual execution of the pre-injection can be accurately detected on the basis of the manner of fluctuation of the fuel pressure PQ detected by the pressure sensor 41 of each fuel injection valve, so that the deviation ΔPR between the required value and the actual value regarding the execution period of the pre-injection can be accurately calculated.

(8) The calculation processes are executed on the basis of the output signals of the pressure sensors 41 that respectively correspond to the cylinders 11 (#1 to #4) of the engine 10. Therefore, in the multi-cylinder engine 10 in which the actuation characteristics of the fuel injections 20 vary from one cylinder to another due to their initial individual product differences or their differences in the time-dependent changes, the injection interval between the pre-injection and the main injection in the fuel injection process performed by each fuel injection valve 20 can be accurately set on the basis of the fuel pressure PQ detected by a corresponding one of the pressure sensors 41 that are provided individually for each cylinder. Due to this, the injection interval in the fuel injection of each cylinder 11 can be set with high accuracy, so that variations of the injection interval among the cylinders 11 can be restrained.

(9) In the fuel injection control apparatus that is liable to be affected by the pressure pulsation that occurs in the fuel supply system because the apparatus adopts the fuel injection valves 20 that are each opened by utilizing the pressure of fuel supplied in the nozzle chamber 25 from the common rail 34, it is possible to accurately adjust the injection interval during execution of the multiple injection.

A fuel injection control apparatus in accordance with a second embodiment of the invention will be described, mainly about differences thereof from the apparatus of the first embodiment. In the following description, substantially the same constructions as those in the first embodiment are denoted by the same reference characters, and detailed descriptions thereof are omitted.

The fuel injection control apparatus in accordance with this embodiment is different from the fuel injection control apparatus in accordance with the first embodiment in the manner of setting control target values regarding the execution period of the post-injection in the calculation process.

In the calculation process in this embodiment, in order to accurately set the injection interval between the main injection and the post-injection, control target values regarding the execution period of the post-injection are set as follows.

Figure 12:
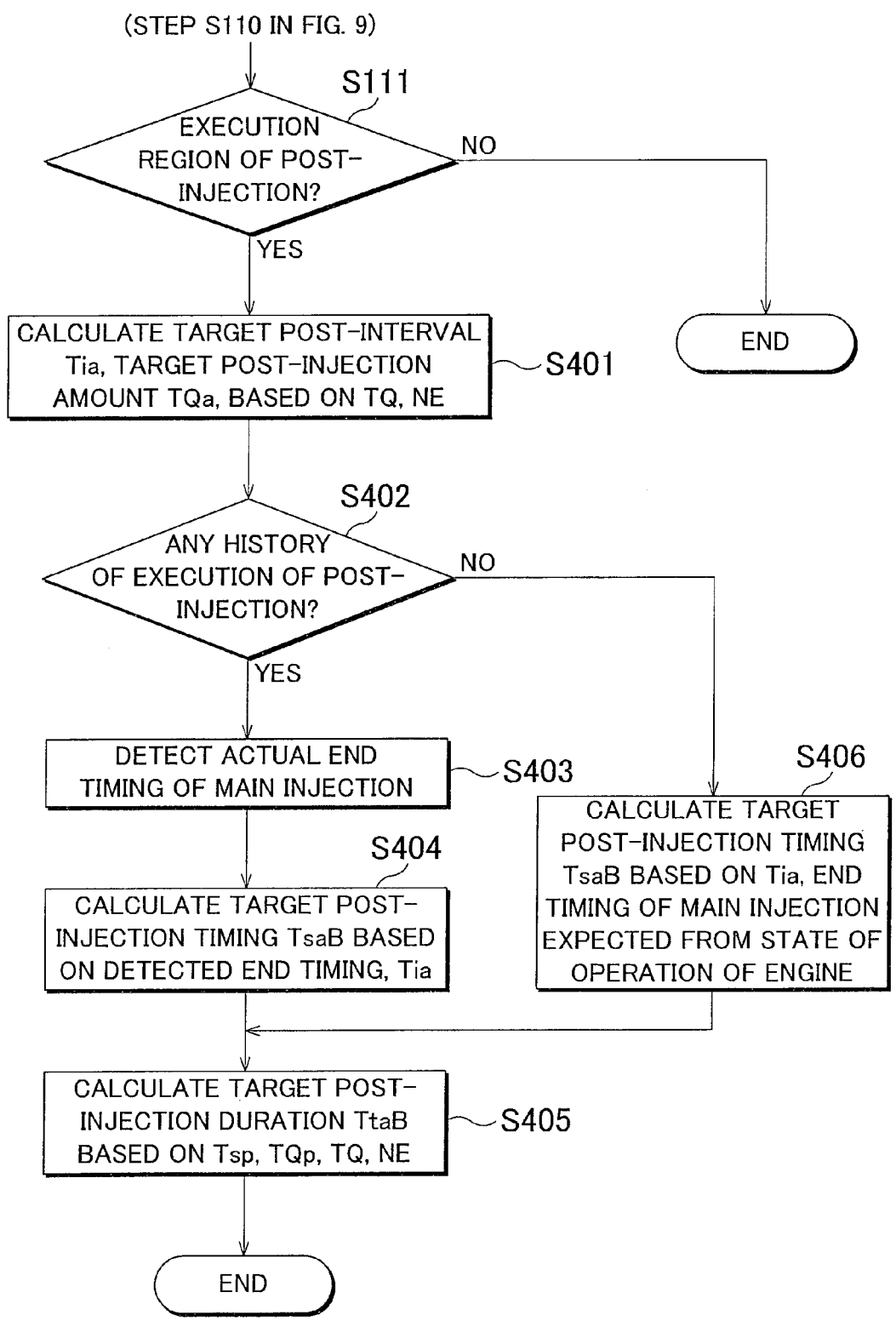
FIG. 12 is a flowchart showing a processing procedure of a calculation process in accordance with a second embodiment of the invention.

FIG. 12 shows a processing procedure of a calculation process in accordance with this embodiment. Incidentally, a series of processes shown in the flowchart in FIG. 12 is executed by the electronic control unit 40 as a process that is performed at every predetermined period.

As shown in FIG. 12, in the calculation process of this embodiment, when the operation region of the engine 10 is in a region in which the post-injection is executed (YES in step S111), a target post-interval Tia and a target post-injection amount TQa are calculated on the basis of the target fuel injection amount TQ and the engine rotation speed NE (step S401). Incidentally, as for the target post-interval Tia, control target values regarding the interval between the end timing of the main injection and the start timing of the post-injection are calculated. Besides, as for the target post-injection amount TQa, control target values regarding the fuel injection amount provided by the post-injection are calculated.

In this embodiment, a relation between the state of operation of the engine determined by the target fuel injection amount TQ and the engine rotation speed NE and the target post-interval Tia that is suitable for the state of operation of the engine 10 is found beforehand on the basis of results of experiments or simulations, and is stored in the electronic control unit 40. Likewise, a relation between the foregoing state of operation of the engine 10 and the target post-injection amount TQa suitable for the state of operation is found beforehand on the basis of results of experiments or simulations, and is stored in the electronic control unit 40. On the basis of these relations, the target post-interval Tia and the target post-injection amount TQa are calculated in the process of step S401.

After that, it is determined whether or not there is a history of execution of the post-injection (step S402). If there is a history of execution of the post-injection (YES in step S402), the end timing of the main injection is detected on the basis of the manner of fluctuation of the fuel pressure PQ detected at the time of the previous execution of the main injection (step S403). Concretely, a detection time waveform is formed on the basis of the manner of fluctuation of the fuel pressure PQ, and the valve-closing operation completion timing Tce (see FIG. 4) on the detection time waveform is detected as the end timing of the main injection.

Then, a control target value regarding the start timing of the post-injection (target post-injection timing TsaB) is calculated on the basis of the valve-closing operation completion timing Tce and the target post-interval Tia (step S404).

Besides, a control target value regarding the execution duration of the post-injection (target post-injection duration TtaB) is calculated on the basis of the target post-injection timing TsaB, the target post-injection amount TQa, the target fuel injection amount TQ and the engine rotation speed NE (step S405). After that, this process is temporarily ended. Incidentally, in this embodiment, a relation between the state of operation of the engine 10 determined by the target post-injection timing TsaB, the target post-injection amount TQa, the target fuel injection amount TQ and the engine rotation speed NE and the target post-injection duration TtaB that is suitable for the state of operation of the engine 10 is found beforehand on the basis of results of experiments or simulations, and is stored in the electronic control unit 40. In the process of step S405, the target post-injection duration TtaB is calculated on the basis of the foregoing pre-stored relation.

On the other hand, if there is no history of execution of the post-injection (NO in step S402), the target post-injection timing TsaB is calculated on the basis of the end timing of the main injection expected from the state of operation of the engine 10 (concretely, the target main injection timing Tsm, the target main injection duration Ttm and the engine rotation speed NE) and the target post-interval Tia (step S406).

Then, a control target value regarding the execution duration of the post-injection is calculated on the basis of the target post-injection timing Tsa, the target fuel injection amount TQ and the engine rotation speed NE (step S405). After that, the process is temporarily ended.

Incidentally, in the apparatus in accordance with this embodiment, when the correction process. (see FIG. 11) for correcting the control target values regarding the execution period of the post-injection is to be executed, the foregoing target post-interval Tia is used as a calculation parameter for use for the calculation of a correction time waveform. Incidentally, the target post-interval Tia is used for the calculation of the correction time waveform without reflecting the correction term Ka3 in the target post-interval Tia.

By setting the target post-injection timing TsaB and the target post-injection duration TtaB as described above, the following effects are attained. FIG. 13 shows an example of a relation between the main injection and the post-injection. In FIG. 13, a solid line shows the actual value regarding the execution periods of the main injection and of the post-injection, and a one-dot chain line shows the required value regarding the execution period of the main injection that is expected from the target main injection timing Tsm and the target main injection duration Ttm that are used in the previous execution of the post-injection.

In the calculation process in accordance with this embodiment, in the case where there is a history of execution of the post-injection, the actual end timing of the main injection can be accurately grasped on the basis of the manner of fluctuation of the fuel pressure PQ detected by the pressure sensor 41.

Then, the target post-injection timing Tsa can be set on the basis of the target post-interval Tia, with reference to the actual end timing of the main injection grasped in the foregoing manner. That is, the timing (time t23) at which a period corresponding to the target post-interval Tia elapses starting at the actual end timing (time t22) can be set as the target post-injection timing TsaB.

Therefore, even in the case where there is a departure between the actual value (time t22) and the required value (time t21) of the end timing of the main injection, the injection interval between the main injection and the post-injection can be set on the basis of the actual end timing (time t22), so that the injection interval can be accurately set in a manner that is appropriate for actual conditions. Therefore, it becomes possible to accurately adjust the injection interval between the main injection and the post-injection independently of the initial individual product differences or time-dependent changes in the fuel supply system.

If the start timing of the post-injection is changed, the pressure in the combustion chamber at the time of execution of the post-injection correspondingly changes, so that the amount of fuel injected from the fuel injection valve 20 also changes. Therefore, when the start timing of the post-injection is changed, it becomes possible to restrain unnecessary changes in the amount of fuel injection by changing the execution duration of the post-injection in addition to the changing of the start timing. Besides, in the apparatus of the embodiment, since the rail pressure control is executed, the degree of change that occurs in the fuel injection amount when the start timing of the post-injection is changed varies according to the rail pressure. In consideration of this respect, this embodiment adopts the foregoing rail pressure (specifically, the target fuel injection amount TQ and the engine rotation speed NE that are parameters for calculation of the target rail pressure Tpr) as a setting parameter for use for setting the target post-injection duration TtaB. Therefore, the fuel injection amount provided by the post-injection is properly adjusted through the setting of the target post-injection duration TtaB in the foregoing manner.

The foregoing embodiments may be carried out with modifications as follows.

In the first embodiment, values gently changed from values (provisional values VR1 and VR2) able to compensate for the deviation ΔPR are calculated as the correction terms Kp1 and Kp2, and the target pre-injection timing Tsp and the target pre-injection duration Ttp are corrected by the correction terms Kp1 and Kp2. Instead of this, the deviation ΔPR may be gently changed, and the target pre-injection timing Tsp and the target pre-injection duration Ttp may be calculated on the basis of the gently changed deviation ΔPR.

In the first embodiment, the process of calculating as the correction terms Kp1 and Kp2 the values that are able to correct the deviation ΔPR may be omitted. In this case, the target pre-injection timing Tsp and the target pre-injection duration Ttp can be calculated by calculating correction terms on the basis of the deviation ΔPR, the target fuel injection amount TQ and the engine rotation speed NE, and then correcting the target pre-injection timing Tsp and the target pre-injection duration Ttp by the correction terms. Besides, it is also possible to calculate the target pre-injection timing Tsp and the target pre-injection duration Ttp on the basis of the deviation ΔPR, the target main injection timing Tsm, the target pre-interval Tip, the target pre-injection amount TQp, the target fuel injection amount TQ and the engine rotation speed NE, without calculating a correction term.

In the first embodiment, the control target values regarding the execution period of a preceding injection (the target pre-injection timing Tsp and the target pre-injection duration Ttp) are set on the basis of the control target value of the start timing of the succeeding injection (the target main injection timing Tsm), the control target value (the target pre-interval Tip) and the deviation (ΔPR) between the required value and the actual value of the end timing of the succeeding injection. This construction of setting may be used for setting the injection interval between pre-injections in a fuel injection control apparatus that executes a plurality of divided pre-injections. This construction may also be used for setting the injection interval between divided main injections in an apparatus that executes a plurality of divided main injections. In short, the foregoing construction can be applied to any fuel injection apparatus as long as the apparatus performs the fuel injection from a fuel injection valve 20 in one combustion cycle by a multiple injection process that includes at least a preceding injection and a succeeding injection that are executed with an interval therebetween. In such a fuel injection apparatus, it suffices that the process of setting the execution period of a preceding-side fuel injection by using the start timing of a succeeding-side fuel injection is executed sequentially from the succeeding-side fuel injection to the preceding-side fuel injection.

In the first embodiment, the correction process (see FIG. 11) for correcting the control target values regarding the execution period of the post-injection may be executed separately for each one of post-injections in an apparatus that executes a plurality of divided post-injections. In this case, it suffices that the correction term Ka3 calculated in the correction process regarding a preceding-side post-injection is used in calculating the correction time waveform in the correction process regarding a succeeding-side post-injection.

In the first embodiment, if the deviation between the required value and the actual value of the end timing of the pre-injection can be accurately grasped, it is also permissible to detect the deviation in the valve-opening operation start timing between the detection time waveform and the basic time waveform of the pre-injection, the deviation in the maximum injection rate attainment timing therebetween, the deviation in the injection rate decrease start timing therebetween, etc.

In the first embodiment, the method of calculating the actual execution period of the pre-injection and the method of calculating a deviation between the actual value and the required value of the execution period of the pre-injection can be arbitrarily changed.

In the second embodiment, the target post-injection timing TsaB and the target post-injection duration TtaB may be set by the following procedure. That is, the target post-injection timing TsaB and the target post-injection duration TtaB are firstly calculated on the basis of the valve-closing operation completion timing Tce, the target post-interval Tia and the target post-injection amount TQa. After that, a difference ΔMA between the required value and the actual value of the end timing of the main injection is calculated on the basis of the manner of fluctuation of the fuel pressure PQ detected at the time of the previous execution of the post-injection. Then, the correction term KaA regarding the target post-injection timing TsaB and the correction term KaB regarding the target post-injection duration TtaB are calculated on the basis of the difference ΔMA, the target fuel injection amount TQ and the engine rotation speed NE. After that, a value obtained by correcting the target post-injection timing TsaB by the correction term KaA is set as a final target post-injection timing TsaB, and a value obtained by correcting the target post-injection duration TtaB by the correction term KaB is set as a final target post-injection duration TtaB.

In the foregoing construction, values (provisional value VRA and VRB) able to compensate for the foregoing difference ΔMA may be calculated, and values gently changed from the provisional values VRA and VRB may be calculated as correction terms KaA and KaB. As the correction term KaA, for example, a value that satisfies a relational expression [the correction term KaAt←the previously calculated correction term KaA+the provisional VRA×n (where 0<n<1)] can be calculated. As the correction term KaB, for example, a value that satisfies a relational expression [the correction term KaB←the previously calculated correction term KaB+the provisional VRB×n (where 0<n<1)] can be calculated. According to this construction, it becomes possible to restrain sharp changes of the correction terms KaA and KaB. Therefore, even in the case where the calculated difference ΔMA is a value that may possibly lower the accuracy in setting the correction terms KaA and KaB due to the effect of noise or sharp changes in the state of operation of the engine 10, decline in the accuracy in setting the target post-injection timing TsaB or the target post-injection duration TtaB can be restrained.

In the foregoing construction, the difference ΔMA may be gently changed, and the target post-injection timing TsaB and the target post-injection duration TtaB may be calculated on the basis of the gently changed difference ΔMA.

In the second embodiment, the timing at which a period that corresponds to the control target value of the injection interval (the target post-interval Tia) elapses starting at the actual end timing of a preceding injection (the main injection) is set as a control target value of the start timing of the succeeding injection (the target post-injection timing TsaB). This construction may also be used for setting the injection interval between injections in a fuel injection control apparatus that executes a plurality of divided post-injections. Besides, this construction may also be used for setting the injection interval between injections in a fuel injection control apparatus that executes a plurality of divided pre-injections or the injection interval between injections in a fuel injection control apparatus that executes a plurality of divided main injections. In short, the foregoing construction can be applied to any fuel injection control apparatus as long as the apparatus performs the fuel injection from a fuel injection valve 20 in one combustion cycle by a multiple injection process that includes at least a preceding injection and a succeeding injection that are executed with an interval therebetween. In such a fuel injection apparatus, it suffices that the process of setting the execution period of a succeeding-side fuel injection by using the end timing of a preceding-side fuel injection is executed sequentially from the preceding-side fuel injection to the succeeding-side fuel injection.

In each embodiment, the control process (see FIG. 10) for correcting the control target values regarding the execution period of the main injection and the correction process (see FIG. 11) for correcting the control target values regarding the execution period of the post-injection may be omitted.

In each embodiment, the rail pressure control may be omitted. If the pressure that can serve as an index of the actual fuel pressure within each fuel injection valve 20 (more specifically, within the nozzle chamber 25), that is, the fuel pressure that changes with changes in the actual fuel pressure, can be properly detected, the manner of attaching the pressure sensors 41 can be arbitrarily changed, regardless of whether or not the pressure sensors 41 are directly attached to the fuel injection valves 20. Concretely, a pressure sensor 41 may be attached to a site (of the branch passageway 31*a*) between the common rail 34 and the fuel injection valve 20, or may be attached to the common rail 34.

Instead of the fuel injection valves 20 that are driven by the piezoelectric actuator 29, it is also possible to adopt, for example, fuel injection valves that are driven by an electromagnetic actuator that is equipped with a solenoid coil.

The invention is applicable not only to an internal combustion engine that has four cylinders, but also to a single-cylinder internal combustion engine, an internal combustion engine that has two cylinders, an internal combustion engine that has three cylinders, or internal combustion engines that has five or more cylinders.

The invention claimed is:

1. A fuel injection control apparatus which is applied to an engine equipped with a fuel supply system that supplies fuel in an increased pressure state to a fuel injection valve, and which performs a fuel injection from the fuel injection valve in a combustion cycle by a multiple injection that includes at least a preceding injection and a succeeding injection that are executed with an interval between the preceding injection and the succeeding injection, the fuel injection control apparatus comprising:
a fuel pressure detector configured to detect a fuel pressure that changes with a change in an actual fuel pressure in the fuel injection valve when the fuel injection valve opens;
a deviation calculation portion configured to calculate a deviation between a required value and an actual value regarding an execution period of the preceding injection based on a manner of fluctuation of the fuel pressure detected by the fuel pressure detector; and
a preceding injection setting portion configured to set a control target value regarding a start timing of the succeeding injection and a control target value regarding an injection interval between the preceding injection and the succeeding injection individually based on state of operation of the engine, and also configured to set a control target value regarding the execution period of the preceding injection based on the control target values that are individually set and the deviation that is calculated by the deviation calculation portion.

2. The fuel injection control apparatus according to claim 1, wherein
the deviation calculation portion calculates the deviation between a required value and the actual value regarding an end timing of the preceding injection.

3. The fuel injection control apparatus according to claim 1, wherein
the preceding injection setting portion individually sets a control target value regarding a start timing of the preceding injection and a control target value regarding an execution duration of the preceding injection, as the control target value regarding the execution period of the preceding injection.

4. The fuel injection control apparatus according to claim 3, wherein
the fuel supply system includes a pressure-accumulating container that accumulates fuel in the increased pressure state and that is connected to the fuel injection valve, and the fuel injection control apparatus further comprising:
an adjustment portion configured to adjust the fuel pressure in the pressure-accumulating container based on the state of operation of the engine, wherein
the preceding injection setting portion individually sets the control target value regarding the start timing of the preceding injection and the control target value regarding the execution duration of the preceding injection based on the fuel pressure in the pressure-accumulating container.

5. The fuel injection control apparatus according to claim 1, wherein
the preceding injection setting portion calculates a control basic value regarding the execution period of the preceding injection based on the control target value regarding the start timing of the succeeding injection and the control target value regarding the injection interval, and to calculate a correction term based on the deviation, and to set a value in which the correction term is reflected on the control basic value, as the control target value regarding the execution period of the preceding injection.

6. The fuel injection control apparatus according to claim 5, wherein
the preceding injection setting portion gently changes the calculated correction term to a value that is appropriate for the deviation.

7. The fuel injection control apparatus according to claim 1, wherein
the fuel injection control apparatus executes as the multiple injection a fuel injection that includes a further succeeding injection that is executed at an interval following completion of execution of the succeeding injection, and the fuel injection apparatus further comprises:
a correction portion configured to correct the control target value regarding the execution period of the succeeding injection based on the fuel pressure detected by the fuel pressure detector;
a required value calculation portion configured to calculate a required value regarding the injection interval between the succeeding injection and the further succeeding injection based on the state of operation of engine; and
a succeeding injection setting portion configured to set a control target value regarding the execution period of the further succeeding injection based on a value in which an amount of correction made by the correction portion is reflected on the required value.

8. The fuel injection control apparatus according to claim 1, wherein
the fuel pressure detector is a pressure sensor that is attached to the fuel injection valve.

9. The fuel injection control apparatus according to claim 1, wherein
the engine has a plurality of cylinders, and the fuel supply system has a pressure-accumulating container that accumulates fuel in the increased pressure state, and the fuel injection valve is provided individually for each cylinder, and the fuel injection valves are individually connected to the pressure-accumulating container, and the fuel pressure detector is provided individually for each cylinder of the engine, and each fuel pressure detector is configured to detect the fuel pressure at a site in a fuel supply passageway that supplies fuel to a corresponding one of the fuel injection valves, the site being between the pressure-accumulating container and an injection hole of the corresponding one of the fuel injection valves.

10. The fuel injection control apparatus according to claim 1, wherein the fuel injection valve has a pressure chamber that operates so that the fuel pressure in the pressure chamber urges a needle valve to a valve-closing side, and a nozzle chamber that is supplied with fuel in the increased pressure state and that operates so that the fuel pressure in the nozzle chamber urges the needle valve to a valve-opening side, and the fuel injection valve performs the fuel injection from an injection hole by lowering the fuel pressure in the pressure chamber so as to move the needle valve.

\* \* \* \* \*